(12) United States Patent
Carpenter

(10) Patent No.: US 8,500,427 B2
(45) Date of Patent: Aug. 6, 2013

(54) METHOD AND APPARATUS FOR FORMING NANO-PARTICLES

(75) Inventor: Ray Douglas Carpenter, Tustin, CA (US)

(73) Assignee: Quantumsphere, Inc., Santa Ana, CA (US)

( * ) Notice: Subject to any disclaimer, the term of this patent is extended or adjusted under 35 U.S.C. 154(b) by 406 days.

(21) Appl. No.: 12/924,136

(22) Filed: Sep. 21, 2010

(65) Prior Publication Data

US 2011/0014310 A1  Jan. 20, 2011

Related U.S. Application Data

(63) Continuation of application No. 11/591,787, filed on Nov. 2, 2006, now Pat. No. 7,803,295.

(51) Int. Cl.
*B29B 9/00* (2006.01)

(52) U.S. Cl.
USPC ....................................... 425/6; 264/5; 264/80

(58) Field of Classification Search
None
See application file for complete search history.

(56) References Cited

U.S. PATENT DOCUMENTS

| | | |
|---|---|---|
| 1,585,413 A | 5/1926 | Price |
| 2,681,637 A | 6/1954 | Simpson |
| 3,145,430 A | 8/1964 | Caron |
| 3,321,079 A | 5/1967 | Sackett, Sr. |
| 3,399,839 A | 9/1968 | Herman et al. |
| 3,456,357 A | 7/1969 | Griffith |
| 3,667,665 A | 6/1972 | Spencer |
| 3,934,475 A | 1/1976 | Rodgers et al. |
| 4,053,264 A | 10/1977 | King |
| 4,297,135 A | 10/1981 | Giessen et al. |
| 4,349,323 A | 9/1982 | Furbish et al. |
| 4,383,852 A | 5/1983 | Yoshizawa et al. |
| 4,445,852 A | 5/1984 | Corbett |
| 4,596,746 A | 6/1986 | Morishita et al. |
| 4,610,857 A | 9/1986 | Ogawa et al. |
| 4,642,207 A | 2/1987 | Uda et al. |
| 4,654,229 A | 3/1987 | Morita et al. |
| 4,670,332 A | 6/1987 | Werner et al. |
| 4,683,118 A | 7/1987 | Hayashi et al. |
| 4,689,075 A | 8/1987 | Uda et al. |
| 4,705,762 A | 11/1987 | Ota et al. |

(Continued)

FOREIGN PATENT DOCUMENTS

EP  0 317 945 B1  1/1993

OTHER PUBLICATIONS

U.S. Appl. No. 11/687,496, Mar. 2007, Carpenter.

(Continued)

*Primary Examiner* — Mary F Theisen
(74) *Attorney, Agent, or Firm* — Knobbe Martens Olson & Bear, LLP

(57) ABSTRACT

Nano-scale particles of materials can be produced by vaporizing material and allowing the material to flow in a non-violently turbulent manner into thermal communication with a cooling fluid, thereby forming small particles of the material that can be in the nano-scale size range. A raw material feeder can be configured to feed raw material toward a heater which vaporizes the raw material. The feeder can include a metering device for controlling the flow of raw material toward the heater. A gas source can also be used to cause gas to flow through a portion of the raw material feeder along with the raw material.

Figure 1:
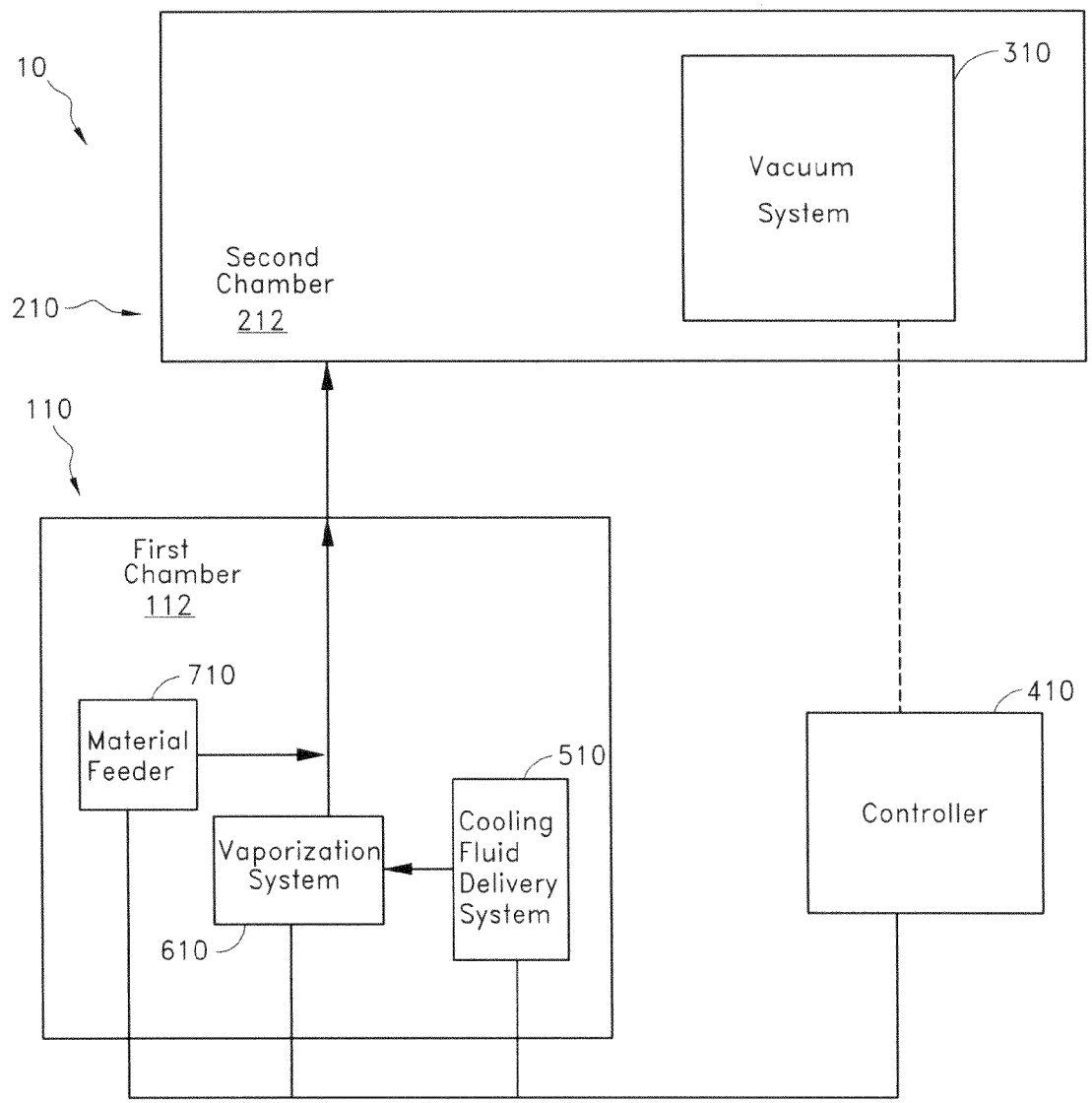

13 Claims, 18 Drawing Sheets
(2 of 18 Drawing Sheet(s) Filed in Color)

(56) References Cited

U.S. PATENT DOCUMENTS

| | | | |
|---|---|---|---|
| 4,714,047 | A | 12/1987 | Ikeda et al. |
| 4,751,070 | A | 6/1988 | Verneker |
| 5,128,081 | A | 7/1992 | Siegel et al. |
| 5,419,071 | A | 5/1995 | Fatica et al. |
| 5,958,329 | A | 9/1999 | Brown |
| 6,558,605 | B1 | 5/2003 | Wilson |
| 6,972,115 | B1 | 12/2005 | Ballard |
| 7,018,606 | B2 | 3/2006 | Tenne et al. |
| 7,282,167 | B2 * | 10/2007 | Carpenter ............ 264/80 |
| 2002/0197889 | A1 | 12/2002 | Nozaki et al. |
| 2003/0091488 | A1 | 5/2003 | Taube et al. |
| 2004/0126624 | A1 | 7/2004 | Akbar et al. |
| 2004/0241430 | A1 | 12/2004 | Jachuck et al. |
| 2005/0115625 | A1 | 6/2005 | White |
| 2007/0092593 | A1 | 4/2007 | Dopp et al. |
| 2008/0108005 | A1 | 5/2008 | Carpenter |

OTHER PUBLICATIONS

Hahn, H. et al., "Processing of Nanophase Ceramics," Ceramic Powder Science II, 1988, pp. 1115-1122, vol. 1.

International Preliminary Report on Patentability for PCT/US2007/083542, dated May 14, 2009.

International Search Report—PCT/US2007/83542 dated—Apr. 22, 2008.

Li, Z. et al., "Fractographic Study of Sintered Nanophase $TiO_2$," Materials Letters, Apr. 1988, pp. 195-201, vol. 6, iss. 7.

Li, Z. et al., "New Phases of Erbium Oxides," Materials Letters, Jun. 1988, pp. 342-346, vol. 6, iss. 10.

Melendres, C.A. et al., "Raman Spectroscopy of Nanophase $TiO_2$," Journal of Materials Research, Sep./Oct. 1989, pp. 1246-1250, vol. 4, iss. 5.

Pesiri, D. et al., "Industrial Scale Nano-Aluminum Powder Manufacturing," Journal of Pyrotechnics, Summer 2004, pp. 19-31, iss. 19.

Siegel, R.W. et al., "Nanophase Materials," Current Trends in the Physics of Materials, 1987, pp. 403-418.

Siegel, R.W. et al., "Structure and Properties of Nanophase $TiO_2$," Journal de Physique, Oct. 1988, pp. C5-681-C5-686, vol. 49, supp. 10.

* cited by examiner

METHOD AND APPARATUS FOR FORMING NANO-PARTICLES

RELATED APPLICATION

This application is a continuation of pending U.S. patent application Ser. No. 11/591,787, filed on Nov. 2, 2006, which is incorporated herein by reference.

BACKGROUND OF THE INVENTIONS

1. Field of the Inventions

The inventions disclosed herein relate to the production of nano-sized particles. More particularly, the inventions relate to the handling of raw material, the vaporization, condensation, and formation of nano-sized particles as well as for the handling of nano-scale particles after formation.

2. Description of the Related Art

Techniques for producing nano-particles generally fall into one of three categories, namely: mechanical, chemical or thermal processing. In mechanical processes, nanopowders are commonly made by crushing techniques such as ball milling. There are several disadvantages to this approach. The grinding media and the mill wear away and combine with the nanomaterial, contaminating the final product. Additionally, nano-particles produced by ball milling tend to be non-uniform in size and shape and have a wide distribution of particle sizes.

Chemical processes can be used to create nanomaterials through reactions that cause particles to precipitate out of a solution, typically by reduction of organo-metallic materials. Such methods can produce powders contaminated by unreacted materials such as carbon. Additionally, precipitation tends to form large particles and agglomerates rather than nano-scale particles.

Thermal processes utilize vaporization and quenching phases to form nano-scale particles. Such known processes have accomplished vaporization using techniques such as joule heating, plasma torch synthesis, combustion flame, exploding wires, spark erosion, ion collision, laser ablation and electron beam evaporation. Plasma torch synthesis tends to produce particles with a wide distribution of particle sizes as do exploding wire and combustion flame synthesis. Ion collision and electron beam evaporation tend to be too slow for commercial processes. Laser ablation has the disadvantage of being extremely expensive due to an inherent energy inefficiency.

Joule heating has been used in the past to create metal vapors that were condensed to nanomaterials in rapidly flowing turbulent quench gases. This process produces particles with a large size distribution, uses large quantities of gas, and is difficult to scale to commercial bulk production.

SUMMARY OF THE INVENTIONS

An aspect of at least one of the embodiments disclosed herein includes the realization that granular raw materials are typically significantly less expensive than the same material in other forms. For example, many metals are available in granular, extruded wire, bar, rod, and other forms. Of these forms, the granular form is often the least expensive, by a significant margin. However, the granular form is often the least uniform in terms of particle size and surface finish. For example, for many metals, the granular form usually has uneven outer surfaces, and a wide spread of outer diameter sizes that can include particles generally larger than the nano-scale, often times measured on the micron scale and particles as large as fractions of an inch. A system or method that can transform such granular raw material can benefit from the lower raw material cost, resulting in a lower unit cost of manufacturing the resulting nano-scale particles.

Thus, in accordance with at least one of the embodiments disclosed herein, a method of producing nano-scale particles can comprise the steps of vaporizing a granular raw material with a heater device, allowing the raw material vapor to rise from the heater device, and injecting cooling gas into thermal communication with the flow of vaporized raw material.

In accordance with at least another embodiment, a nano-scale particle generator can comprise a first heating device configured to vaporize raw material and a granular raw material feeder configured to feed a granular raw material into contact with the first heating device.

In accordance with at least another embodiment, a nano-scale particle generator can comprise a first heating device configured to vaporize raw material, and means for feeding granular raw material into thermal communication with the first heating device.

Another aspect of at least one of the embodiments disclosed herein includes the realization that systems for feeding raw material toward a heater, such as a heater used for vaporizing the raw material, can become clogged due to the heat from the heater. For example, as the raw material approaches the heater, the heat transferred to the approaching raw material, through radiation or convection, can soften and/or partially melt. As such, the raw material can become clogged in the feeding system.

Thus, in accordance with at least another embodiment, a method of producing nano-scale particles can comprise feeding a raw material into thermal communication with a vaporizing device configured to vaporize the raw material and feeding a gas along with and parallel to the raw material before the raw material reaches the vaporizing device.

In accordance with at least another embodiment, a nano-scale particle generator can comprise a first heating device configured to vaporize raw material and a raw material feeder configured to feed a raw material into contact with the first heating device and to feed a gas along with the raw material through the raw material feeder.

In accordance with at least another embodiment, a nano-scale particle generator can comprise a first heating device configured to vaporize raw material and means for feeding raw material and a gas together toward the first heating device.

Another aspect of at least one of the embodiments disclosed herein includes the realization that cycling the temperature of a heater, such as a heater used for vaporizing a raw material, can reduce or prevent problems associated with feeding raw material into contact with such a heater. For example, but without limitation, some raw materials can bounce off of a heater that is at or above the vaporization temperature of the raw material. However, if the temperature of the heater is lowered below the temperature that causes such bouncing, some materials can more readily stick to and melt on the heater. Afterwards, the heater temperature can be raised to a temperature appropriate for vaporization.

Thus, a method of producing nano-scale particles can comprise maintaining a temperature of a heating device at a first temperature sufficient to vaporize a raw material, vaporizing a raw material with the heater device, and reducing a temperature of the heating device to a second temperature that is lower than the first temperature. The method can also include feeding additional raw material to the heater device and raising the temperature of the heater device to the first temperature.

In accordance with at least another embodiment, a nano-scale particle generator can comprise a heater device configured to vaporize a raw material, and a controller configured to maintain the heater device at a first temperature to and lower the temperature of the heater device to a second temperature that is lower than the first temperature. A raw material feeder device can be configured to feed a raw material toward the heater device. The controller can also be configured to maintain the temperature of the heater device at the first temperature which is sufficiently high so as to vaporize the raw material, to lower the temperature of the heater device to a temperature at or less than the second temperature before the raw material feeder device feeds additional raw material toward the heater device, and to raise the temperature of the heater device after the feeder device has fed the raw material toward the heater device.

Another aspect of at least one of the embodiments disclosed herein includes the realization that a feeder device of a nano-scale particle generator can be improved by incorporating a metering device comprising a moveable receptacle. For example, but without limitation, when generating nano-scale particles from a granular raw material, the metering of such a material can be difficult because of the nature of such typical granular raw materials; such particles usually have uneven outer surfaces and can have a widely ranging particle size distribution. By using a metering device having a moveable receptacle, a desired volume of raw material can be accurately delivered periodically, thereby reducing the likelihood of waste.

Thus, in accordance with at least another embodiment, a nano-scale particle generator can comprise a first heating device configured to vaporize raw material and a raw material feeder configured to feed a raw material into contact with the first heating device, the raw material feeder comprising a moveable receptacle defining a cavity.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above-mentioned and other features of the inventions disclosed herein are described below with reference to the drawings of preferred embodiments. The illustrated embodiments are intended to illustrate, but not to limit the inventions. The drawings contain the following figures:

FIG. 1 is a schematic representation of a cross-sectional view of a nano-scale particle generator having a vaporization system, a cooling fluid delivery system, and a collection system.

FIG. 2A is a front elevational and partial cross-sectional view of a modification of the nano-scale particle generator illustrated in FIG. 1, a chamber housing portions of the vaporization and cooling fluid delivery systems being shown in section.

FIG. 2B is an enlarged partial sectional view of the cooling fluid delivery system of FIG. 2A.

FIG. 3 is a partial cut-away and left side elevational view of the nano-scale particle generator illustrated in FIG. 2A.

FIG. 4 is an enlarged schematic side elevational view of portions of the vaporization and cooling fluid delivery systems of FIG. 2A, vaporized material and cooling fluid flows being represented by arrows.

FIG. 5 is a schematic top plan view of a heating element of the vaporization system illustrated in FIG. 4, vaporized material and cooling fluid flows being represented by arrows.

FIG. 6 is an enlarged schematic illustration of a portion of the collection system of FIG. 2A, the flow and separation of solidified nano-particles and cooling fluid being represented by arrows, circles, and stars.

FIG. 7 is a color photograph illustrating a top plan view of a portion of a modified vaporization system in operation and a flow of vaporized material emanating from a heater element of the vaporization system, the flow of vaporized material being cooled by a cooling fluid and rising with some turbulence.

FIG. 8 is another color photograph showing a top plan view of the heater element shown in FIG. 7, in operation.

FIG. 9 is a color photograph illustrating another top plan view of the heater in operation and a flow of vaporized material emanating from the heater element, the flow of vaporized material being cooled by a cooling fluid and rising without visually perceptible turbulence.

FIG. 10 is a wider angle color photograph of the heater in operation shown in FIG. 9.

FIG. 11 is a schematic cross-sectional view of a modification of a chamber of the nano-particle generator illustrated in FIG. 1.

FIG. 12 is a schematic top plan view of the interior of the nano-particle generator chamber shown in FIG. 11.

FIG. 13 is a schematic perspective view of the nano-particle generator chamber shown in FIG. 11.

FIG. 14 is a schematic cross-sectional view of a modification of the nano-particle generator chamber of FIGS. 11-13 having a raw granular material feeder device.

FIG. 15 is a schematic cross-sectional view of another modification of the nano-particle generator chamber of FIGS. 11-13 having a plurality of raw granular material feeder devices.

FIG. 16 is a schematic side elevational and partial sectional view of a modification of the material feeder of FIG. 14 having a material metering device.

FIG. 17 is an elevational view of a metering device taken along line 17-17 of FIG. 16.

FIG. 18 is a sectional view of the metering device of FIG. 17 taken along line 18-18.

FIG. 19 is an enlarged elevational view of a lower end of a modification of the feeder tube illustrated in FIG. 14.

FIG. 20 is a schematic cross-sectional view of a collection device that can be used with any of the nano-scale particular generators illustrated in FIGS. 1-19.

DETAILED DESCRIPTION OF THE PREFERRED EMBODIMENTS

The following description and examples illustrate preferred embodiments of the present inventions in detail. Those of skill in the art will recognize that there are numerous variations and modifications of these inventions that are encompassed by its scope. Accordingly, the description of preferred embodiments should not be deemed to limit the scope of the present inventions.

"Quench gas" or "quenchant gas" as used in this specification refers to a gas that has a cooling effect on a material and may, depending upon the ambient conditions, induce a phase change in the material. As used within this specification, the term "substantially laminar" includes generally smooth fluid flows that may be completely laminar as well as flows that include turbulent portions, as described and illustrated below, and flows including incidental or transient eddies. The term "substantially free convection," as used in this specification, includes movement of fluids (including gases) due to energy gradients and completely free convection, but may also include fluid movement that is slightly influenced by a vacuum pump as described herein. The term "chamber" is intended to have its ordinary meaning and may include without limitation a vessel or container completely or partially enclosing a space, for example, where a gas curtain or other confining means form a wall of the chamber.

With reference to FIG. 1, one embodiment of an inventive nano-particle generator 10 comprises a particle generation system 110 and a collection system 210, which can include a vacuum system 310. The generator 10 also preferably comprises a controller 410. With such a nano-scale particle generator 10, particles can be formed by the particle generation system 110, optionally utilizing the vacuum system 310 and the controller 410, and delivered for storage and recovery in the collection system 210. In one embodiment, the particle generation system 110 comprises a first chamber 112, a cooling fluid delivery system 510 for delivering cooling fluid, a vaporization system 610 for vaporizing a material, and a material feeder 710, some or all of which may be included within the first chamber 112. Examples of each of these subsystems are described separately below.

In one embodiment, the material feeder 710 is configured to feed one of any type of vaporizable material, e.g., nickel, into the first chamber 112. The material can be in any form, including by example only powder, pellet, sheet, bar, rod, wire, ingot, and the like. The material feeder 710 is configured to feed the material in the form provided sufficiently close to the vaporization system 610 to cause the material to vaporize. Thus, in one exemplary but non-limiting embodiment, where the material is in wire form, the material feeder 710 can be in the form of a wire-feeder device.

Preferably, the material feeder 710 is configured to feed the vaporizable material at a desired rate. A further advantage is provided where the feed rate of the feeder 710 can be adjusted. For example, where the feeder 710 is a wire-feeder device, the feeder 710 can include a mechanism for adjusting the speed at which the wire is discharged therefrom.

In the first chamber 112, the vaporization system 610 is provided and configured to vaporize the material. The vaporization system 610 can comprise any type of device capable of generating a reduced-turbulence flow of vaporized material. A further advantage is achieved where the vaporization system is configured to produce a smooth, substantially and/or completely turbulence-free flow of vaporized material. Such a vaporization system 610 can comprise, for example, but without limitation, a heater device that can be operated in such a manner that the vaporized material can rise from the device under substantially free convention and/or in a substantially laminar manner.

In one exemplary embodiment, the vaporization system 610 comprises an electrical resistance heater preferably configured to allow material from the feeder 710 to vaporize and emanate from the heater in a smooth flow. For example, but without limitation, the heater and the feeder 710 can be arranged such that the material from the feeder 710 is vaporized by heat from the heater. Because the source of heat, or the outer surface of the heater, is stationary, the flow of vaporized material can flow smoothly away from the heater. Other heater devices can also be configured to provide such a smooth flow of vaporized material. For example, but without limitation, where the source of heat is not stationary, such as with a plasma gun heater device, other devices may be used to smooth the flow of vaporized material, such as a plenum/venturi fluid flow device. The smooth flow of vaporized material can thermally communicate with a cooling fluid from the cooling fluid delivery system 510 with reduced turbulence, and thus, enhanced particle characteristics.

The cooling fluid delivery system 510 is configured to provide a smooth flow of cooling or quenchant fluid (such as, for example, but without limitation, one or any combination of Helium, Hydrogen, Nitrogen, Argon, and the like) that flows into thermal communication with the vaporized material emanating from the vaporization system 610. The cooling fluid supplied from the cooling fluid delivery system 510 can thermally interact with the vaporized material from the vaporization system 610 with reduced turbulence.

A further advantage is provided where the cooling fluid delivery system 510 is configured to direct a flow of cooling fluid generally parallel to and at about the same speed as the vaporized material emanating from the vaporization system 610. This configuration allows the cooling fluid to thermally interact with the flow of vaporized material with reduced turbulence. For example, but without limitation, the cooling fluid delivery system 510 can be configured to direct a flow of cooling fluid upwardly toward the flow of vaporized material emanating from the vaporization system 610, at about the same speed as a stable portion of the flow of vaporized material flowing upwardly from the vaporization system 610. The flow of cooling fluid can flow into thermal communication with the flow of vaporized material without excessively interfering with the smooth convective flow of the vaporized material.

In some embodiments, the controller 410 is configured to obtain feedback from each of the controllable systems as well as to send control information to those systems. Optionally, the controller 410 interfaces with an operator who can input specific information and commands to the controller and controllable systems. The contemplated controller-operator interface can comprise visual displays such as dials, gauges, digital character displays, audio signals, light-emitting diodes, computer screens, liquid crystal displays, etc. The contemplated controller-operator interface can also include manipulable input devices such as knobs, levers, buttons, switches, keyboards, joysticks, trackballs, mice, touch-screens, etc.

It is contemplated that the controller 410 can be a hard-wired device or one of a plurality of software-based computer routines. Such computer routine(s) can be part of a larger control program or an independent program. The control program can be configured to run on a dedicated processor or a general purpose processor. The controller 410 can be a single independent unit or multiple units. Where the controller 410 comprises multiple units, those units can be dependent upon or independent of each other.

The collection system 210 is optionally configured to capture the particles resulting from the thermally communicating flows of vaporized material and cooling fluid. In one exemplary embodiment, the collection system 210 comprises a chamber connected to the vaporization system 610. Optionally, the vacuum system 310 can be used to generate a fluid flow out of the collection device. For example, but without limitation, the vacuum system 310 can be configured to draw gases from the second chamber 212 and to discharge those gases to the exterior of the second chamber 212. The vacuum can aid in maintaining a smooth flow of particles and cooling fluid from the first chamber 112. The vacuum system 310 can be configured to generate any magnitude of vacuum within the collection system 210. Advantageously, the vacuum system 310 is configured to generate a relatively small vacuum within the collection system 210, such as, for example, but without limitation, a few Torr below the pressure exterior to the collection system 210.

Optionally, the vacuum generated by the vacuum system 310 can be sufficiently large to affect the flow of vaporized material and cooling fluid within the first chamber 112. Preferably, while the vacuum can be used to speed up the flow of cooled particles and cooling fluid from the first chamber 112, the magnitude of the vacuum is limited so as to prevent disturbance of the flow of vaporized material, cooling fluid, and cooled particles flowing upwardly from the vaporization system 610.

Optionally, the collection system 210 can include a nano-particle filter (not shown). The vacuum system 310 can be configured to draw gases from the second chamber 212 through a nano-scale filter so as to minimize or prevent particles from being pulled through the vacuum system 310 and discharged to the atmosphere.

During operation of the generator 10, material is fed by the material feeder 710 to the vaporization system 610. The vaporization system 610 vaporizes the material, causing the vaporized material to flow upwardly from the vaporization system 610 in a reduced-turbulence manner. Preferably, the flow of vaporized material rises from the vaporization system 610 in a substantially laminar flow and/or under substantially free convection and may, in at least one embodiment of generator 10, rise from the vaporization system 610 in the form of a stable plume, similar in shape to that of a candle flame. The cooling fluid is discharged from the cooling fluid delivery system 510 into thermal communication with the flow of vaporized material.

Optionally, cooling fluid is discharged from the cooling fluid delivery system 510 into thermal communication with the flow of vaporized material. Preferably, the cooling fluid is discharged in a manner that does not disrupt the smooth flow of the vaporized material.

As the vaporized material flows away from the heater, individual atoms of the vapor begin to cool and coalesce into multi-atom droplets and/or particles. Because of the surface tension the liquid droplets form almost perfect spheres. As these multi-atom particles or droplets thermally communicate with the cooling fluid, the liquid droplets solidify into solid spherical particles.

The cooling fluid flows into the collection system 210 with the particles entrained within the fluid flow. As this flow enters the second chamber 212, the flow slows thereby allowing the particles to fall out of the moving flow and collect in the second chamber 212. Preferably, the vacuum system 310 is used to generate a low magnitude vacuum within the second chamber 212, so as to enhance the stability and/or continuity of the flow from the first chamber 112 into the second chamber 212.

Figure 2A:
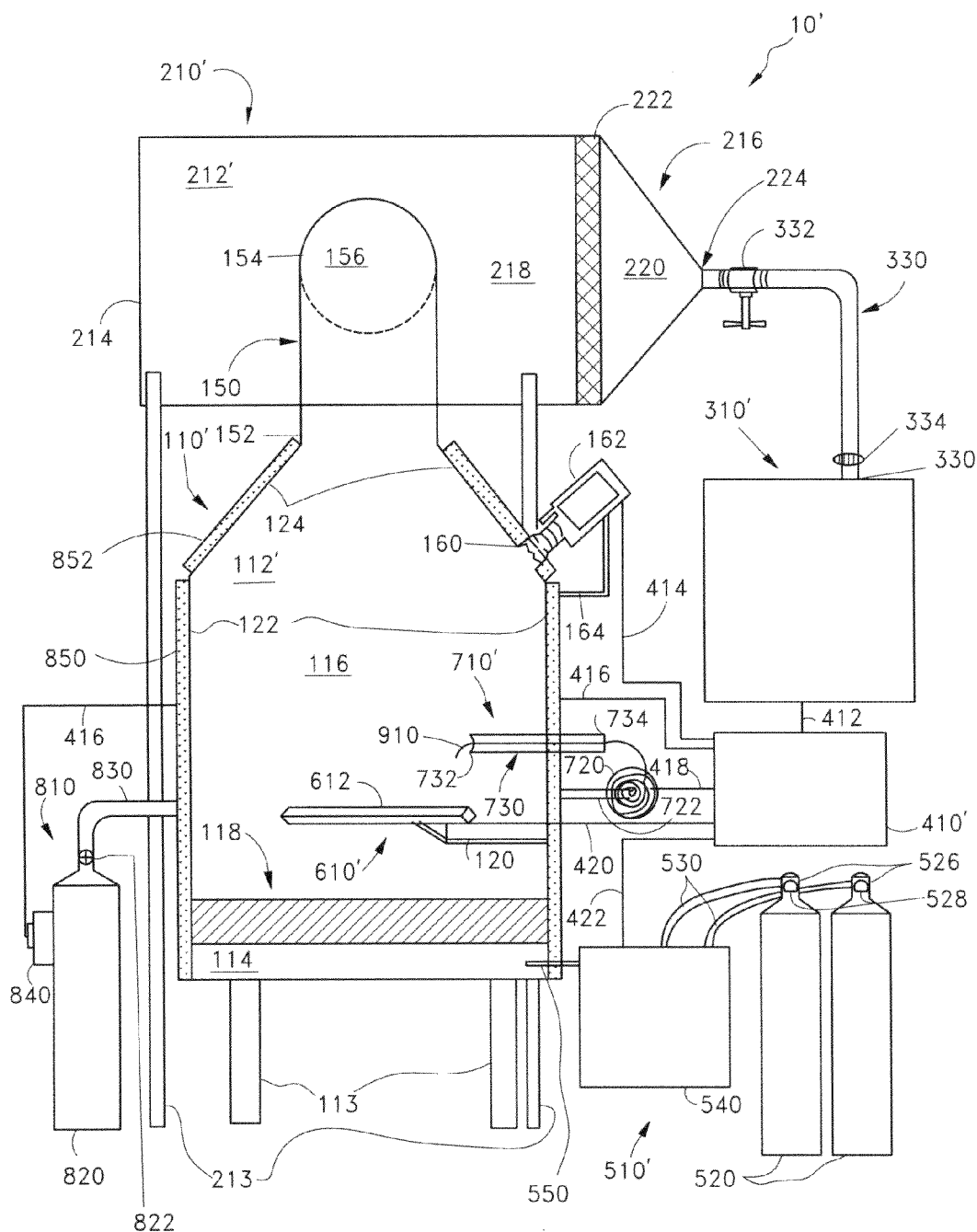

With reference to FIG. 2A, another embodiment of the nano-particle generator 10 is illustrated therein and is identified generally by the reference numeral 10' (ten prime). The components of the generator 10' corresponding to the respective components of the generator 10 are identified with the same reference numerals used with respect to the generator 10, except that a prime symbol "'" has been added thereto.

The generator 10' includes a first chamber 112' that defines an enclosure. In the illustrated embodiment, the first chamber 112' is a generally cylindrical metal tank oriented vertically and tapered at the top to generally form a generally frustro-conical shape.

As illustrated in FIG. 2A, the first chamber 112' has a lower region 114, and an upper region 116. In this embodiment, the lower region 114 is separated from the upper region 116 by a diffuser 118. Within the upper region 116 are situated a heater device 610' with a supporting strut 120, and a material feeder 710'.

The general shape of one embodiment of the first chamber 112', illustrated in FIG. 2, has a cross-section with generally parallel walls 122. At an upper end of the chamber 112', the sides slope inwardly forming upper walls 124 until they meet a tube 150 that extends upwardly from the top of the first chamber 112'. In this embodiment, the first chamber 112' is generally symmetric about an axis extending from the bottom of the chamber 112' to the top of the chamber where the tube 150 is situated. Optionally, the outer surfaces of the walls 122, 124 of the first chamber 112' are in thermal communication with and generally covered by two cooling jackets, a lower cooling jacket 850, and an upper cooling jacket 852. The cooling system is described below in greater detail.

As illustrated in FIG. 2A, certain embodiments can have a plurality of openings in the first chamber 112', including the tube 150 at the top of the chamber. The lower end 152 of the tube 150 is connected to the upper wall 124 of the first chamber 112' so as to connect the interior of the first chamber 112' to the interior of the second chamber 212'. Preferably, the lower end 152 is connected to the upper wall 124 such that no air or gas can escape the first chamber 112' or the tube 150 at the junction.

In an exemplary but non-limiting embodiment, the first chamber 112' can be manufactured from sheets of metal that have been welded together in the described shape, with any openings sealed shut by welding, gaskets, liquid sealant, or other techniques. In this exemplary embodiment, the first chamber 112' has a width at the base of approximately 3.5 feet and a height of approximately 6 feet from the floor to the lower end 152 of the tube 150. The walls 122, 124 of the first chamber 112' are formed from metal and are sealed so that gas cannot easily penetrate into the chamber 112' from outside or escape from within the first chamber 112'.

Preferably, the first chamber 112' includes a window 160 arranged to allow an operator of the generator 10' to view the vaporization and/or the quenching of vaporized material occurring in the vicinity of the heater device 610'. Optionally, the window can be configured for the insertion or orientation of an instrument for observing the vaporization or quenching during operation. In the illustrated embodiment, the window 160 comprises a transparent panel sealed to the upper wall 124. The described configuration allows an operator to look downwardly and view the vaporization and/or quenching during operation. Optionally, a camera 162 can be used to capture a video image or images of the vaporization and/or quenching during operation. In the illustrated embodiment, the camera 162 is oriented to peer downwardly toward the heater device 610' and capture images of the heater device 610' and the vaporization and quenching of material in the vicinity of the heater device 610'.

Figure 3:
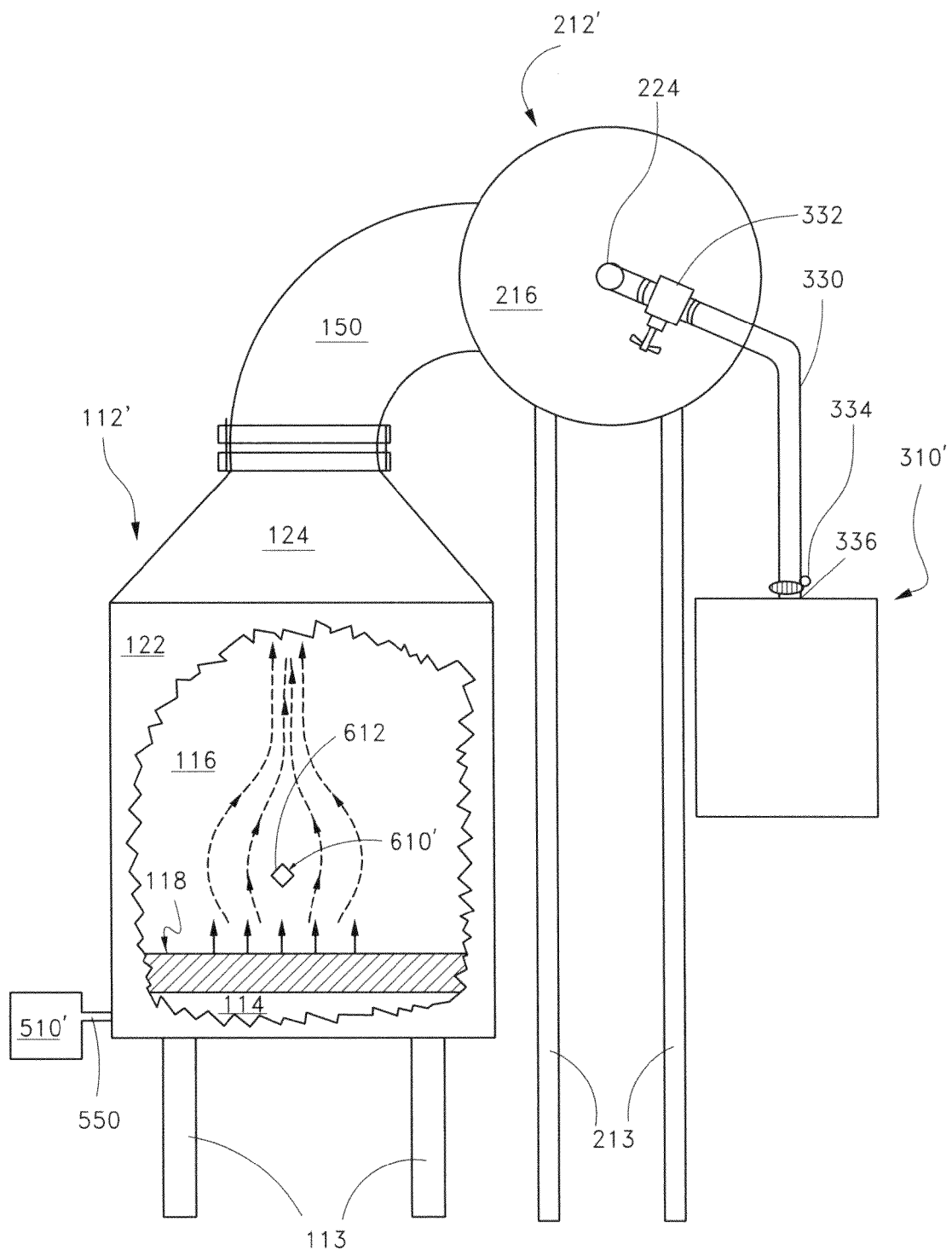
Figure 6:
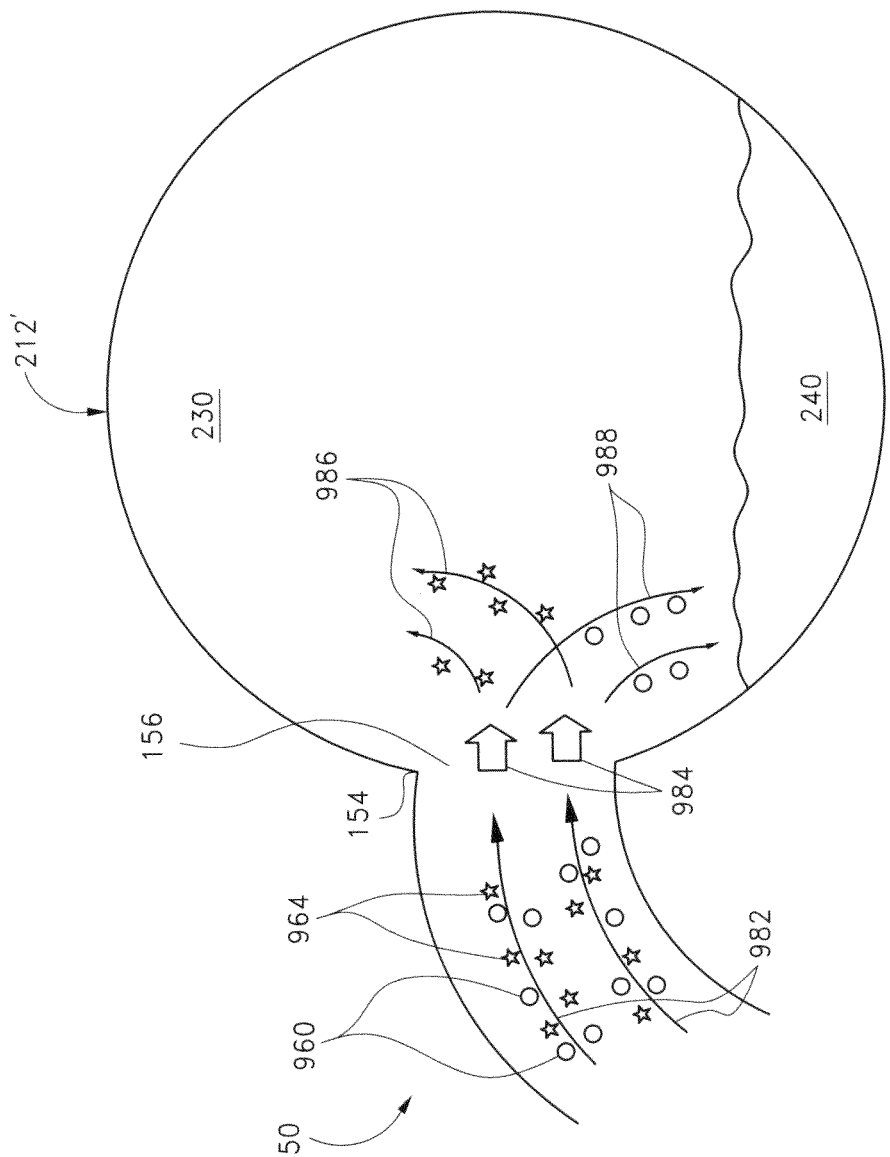

With continued reference to FIG. 2A, the second chamber 212' can be a generally cylindrical metal tank, situated generally above and to the side of the first chamber 112', with the two chambers being connected by the tube 150. The tube 150 preferably is metal, although other suitable materials can be used. The second chamber 212' is supported at a height generally above the first chamber 112' by a plurality of legs 213. The legs 213 can be configured to support the second chamber 212' five or six feet above the floor, although other positions can also be used. In the illustrated embodiment, the second chamber 212' can have the same general shape as the first chamber 112'. FIGS. 3 and 6 provide other views of the second chamber 212'. It is contemplated that the second chamber can comprise any suitable container, and can be constructed of the same materials as the first chamber 112', with metal walls and rivets or other fastening devices or techniques used to hold the metal walls together. The second chamber 212' is generally airtight, but has at least two openings, including one to allow the connection of the tube 150 at the end of the tube 154.

Another opening in the second chamber 212' is disposed at a longitudinal end 224 of the second chamber 212', where a tube 330 connects to the second chamber 212'. The tube 330 connects to the second chamber 212' at the longitudinal end 224 thereof. The tube 330 connects the second chamber 212' to the vacuum system 310'. The tube 330 incorporates at least one valve 332, which can be adjusted to regulate the flow of gas through the tube 330. The tube 330 is connected to the second chamber 212' and the vacuum system 310' using pressure fits, including at least one clamp 334 so that gas is not allowed to escape from the two junctures 224, 336.

The second chamber 212' is separated into two regions, 218 and 220A by a filter 222, shown in cross-section inside the second chamber 212' in FIG. 2. The filter is situated generally toward the end 216 of the second chamber 212'. The filter 222 is configured to contact the sides of the second chamber 212', and is placed between the opening where the tube 150 enters the second chamber 212' and the opening where the tube 330 connects to the second chamber 212' so that the filter 222 allows nano-particles to enter the second chamber 212' but not to escape to the ambient.

In the embodiment illustrated in FIG. 2A, cooling fluid delivery system 510' comprises a source of cooling gas, which, in this embodiment, comprises multiple gas tanks 520 with valves 526 connected to tubes 530 which in turn connect to a mixer 540. The mixer 540 includes a protruding pipe 550. The cooling fluid delivery system 510' is configured to supply gas to be passed through the diffuser 118 and toward the heater device 610'. The pipe 550 penetrates the wall of the first chamber 112'. In this embodiment, the pipe 550 extends from the outside of the first chamber 112' into the lower region 114 of the first chamber 112'. The pipe 550 is configured to guide cooling gas to pass from outside the first chamber 112' into the lower region 114 of the first chamber 112'. Preferably, the pipe 550 does not allow air from outside the system into the first chamber 112', and does not allow gas from inside the first chamber 112' to escape therefrom. The lower region 114 can serve as a "plenum." One alternative embodiment of the diffuser 118 is described below with reference to FIG. 2B.

In one embodiment, the gas tanks 520 can be commercially available metal pressurized gas tanks. The gas tanks 520 have a flow regulator valves 526 with knobs 528 that can be turned to decrease or increase the flow of gas from the tank into the connected tubes 530. The tubes 530 are connected to the mixer 540 and the tanks 520 in such a way that gas does not escape and no outside air can penetrate the cooling fluid delivery system 510'. The pipe 550 that connects the mixer 540 with the lower region 114 of the first chamber 112' is connected to the mixer 540 and the first chamber 112' in such a way as to not allow any outside air to penetrate into the nano-particle generator 10', but to allow gas to move from the mixer 540 through the wall 122 of the first chamber 112' into the lower region 114 of the first chamber 112'. It is contemplated that more permanent gas tanks may be used, as for example, for large scale production.

It is contemplated that the cooling fluid delivery system 510' could be a commercially available system or any equivalent known by those of ordinary skill in the art. The cooling gas or gases used can be any pure gas or mixture of inert or reactive gases including, but not limited to, argon, helium, hydrogen, nitrogen, carbon dioxide and oxygen. Materials that can be vaporized at elevated temperatures and/or reduced pressures can also be used as cooling gases.

The diffuser 118 within the first chamber 112' can be any type of commercially available diffuser. Preferably, the diffuser 118 is made from a sintered material such as, for example, but without limitation, porous stainless steel. The diffuser 118 is configured to allow the cooling gas to move from the lower region 114 to the upper region 116 with a generally uniform flow profile. The described configuration allows the cooling gas to move evenly around the heater device 610' and flow smoothly into thermal communication with a flow of vaporized material emanating from the heater device 610'. A further advantage is provided where the diffuser 118 is larger than the heater device 610'. In such an embodiment, the diffuser 118 can provide a flow of cooling gas that surrounds a flow of vaporized material emanating from the heater device 610', thereby further enhancing the flow of the cooling gas into thermal communication with the flow of vaporized material, described in greater detail below.

In some embodiments, different kinds of cooling gas can be mixed prior to passing through the diffuser 118. For example, if an operator wishes to raise the heat capacity of a mixture of cooling gas, the operator can mix in a second cooling gas that has a higher heat capacity. In this way, the cooling capacity of a desired volume of mixed cooling gases can be raised. Optionally, the cooling gases can be mixed to the desired proportions and stored in a single tank ready for use with the generator 10'. If desired, a mixing device (not shown) can be connected to first and second gas supplies providing first and second cooling gases. Such a mixing device can be configured to mix the first and second gases and continuously supply the mixed gases to the lower portion 114 or the diffuser 118. Such a mixer may be of a type commercially available. For example, in an exemplary but non-limiting embodiment, an MKS brand mixer, such as model no. 247 can be used.

Figure 2B:
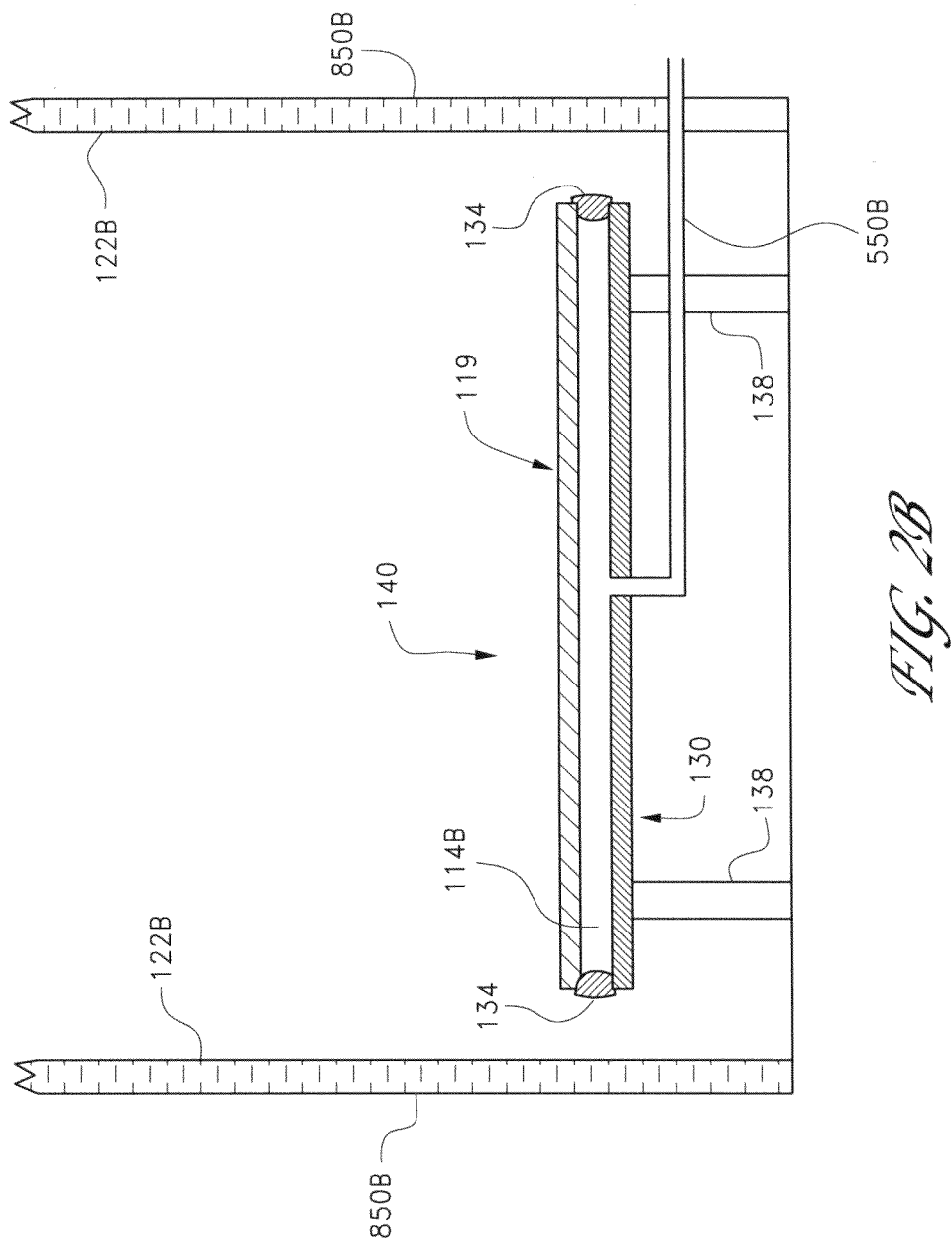

FIG. 2B illustrates an alternative embodiment of the diffuser 118 of FIG. 2A. FIG. 2B is a cross-sectional view detailing a modification of the diffuser 118, identified generally with the reference numeral 119. The diffuser 119 is configured for diffusing a flow of cooling gas into the first chamber 112'. Components of the diffuser 119 that are the same as the diffuser 118 have been given the same reference numerals, except that a letter "B" has been added.

In this embodiment, the diffuser 119 has a plenum 114B into which the pipe 550B feeds the cooling gas. The plenum 114B can be bounded by a solid metal plate 130 below, and a sintered metal plate 119 above. In an exemplary but non-limiting embodiment, the sides of the diffuser 188B can be comprised of a stainless steel welding rod 134, welded into place. The welding rod serves to hold the two plates and to seal the plenum 114B so that cooling gas can only escape through the sintered metal plate 119. In one embodiment, the diffuser 119 is supported by metal legs 138.

Referring back to FIG. 2A, in a preferred embodiment, a heater device 610' is situated in the upper region 116 of the first chamber 112' and is supported above the diffuser 118, 119. The heater device 610' comprises a heating element 612 supported by two supporting struts 120. In this embodiment, one supporting strut 120 is connected to the side of the first chamber 112' and extends inwardly and the second is connected to the flow of the chamber and extends upward. The struts hold the heating element 612 generally in the upper region 116 of the first chamber 112' and above the diffuser 118.

In an exemplary but non-limiting embodiment, the heating element 612 can be approximately 170 millimeters long. The heating element 612 can be provided with an electrical current that heats the element 612 as the electrical current flows from one end of the element 612 to the other. In one embodiment, the heater device 610' comprises a titanium-diboride heater bar, such as that commercially available from a company known as General Electric Advanced Ceramics. Preferably, the heating element 612 is configured to maintain and withstand temperatures sufficient to vaporize the desired material. In an exemplary but non limiting embodiment, the heating element 612 can have a surface temperature of about 2000 degrees Celsius and is configured to vaporize nickel. Additionally, the heating element can be of any size, thickness, shape, or length.

Generally, when the heating element 612 vaporizes a material, the vaporized material can flow upwardly in a fluidic flow. If the flow is not meaningfully disturbed, the flow will resemble the shape of the flame of a candle. In one exemplary but non-limiting embodiment, the first chamber 112' is sized so that the flow is allowed to rise above the heater element 612 to a height of about three-times the length of the heater element 612. This provides a further advantage in that there will be sufficient time for the cooling effect of the cooling fluid, described in greater detail below, to achieve a high quality, narrow particle size distribution.

In some contemplated embodiments, the heater device 610' comprises a commercially available electrical resistance element heater. The heater device 610' can also be a hollow tube furnace or slot furnace. The material can be any vaporizable material. Advantageously, the material can be any pure metal, oxide or alloy that can be evaporated by the heating source, usually at a low pressure, in the particle generator 10'.

Referring to FIG. 2A, in some embodiments, the material feeder 710' can comprise an access tube 730, with an inner end 732 and an outer end 734. Additionally, the material feeder 710' can further comprise a material feeder device 720 supported by a support member 722 that connects the wall 122 of the first chamber 112' with the material feeder device 720. Preferably, the access tube 730 is configured to allow material 910 to enter the first chamber 112' through the wall 122 of the first chamber 112' without allowing air from outside the first chamber 112' to penetrate the interior of the first chamber 112'. As shown in FIG. 2, the material feeder 710', is positioned higher than the heating element 612 with the inner end 732 of the access tube 730 directly above the heating element 612 such that the material 910, drops directly onto the heating element 612. The material 910 may comprise metal wire. It is contemplated that the material feeder 710' can comprise any system, commercially available or otherwise, but that in one embodiment the material feeder 710' is configured to feed a thin metal wire through the wall of the first chamber 112' at an adjustable rate.

In another embodiment, the material feeder 710' and the heating element 612 can be combined in function so that the material is melted and flows into the first chamber 112' in a liquid form. It is contemplated that the material can be in any of a number of forms instead of wire, such as ingots or pellets. The material can be any pure metal, oxide or alloy that can be evaporated by the heating element 610.

In the embodiment illustrated in FIG. 2, the vacuum system 310' is a commercially available unit that is connected to the collection system 210' by a tube 330. The vacuum system 310' is located at a distance from the first chamber 112' and the second chamber 212', in part to minimize unwanted vibrations from transferring between the vacuum system 310' and the first chamber 112'. In this embodiment, the vacuum system produces a mild vacuum gently urging the gas within the first chamber 112' and the second chamber 212' to flow upwardly through the diffuser 118 past the heating element 612 through the tube 150 into the second chamber 212' from the first region 218 of the second chamber 212' through the filter 222 into the frustroconical region 220 of the second chamber 212' through the valve 332 and tube 330 and into the vacuum system 310'. In the current embodiment, the vacuum system 310' is connected to an electrical power grid through an electrical plug. In one embodiment, the vacuum system 310' can be insulated to minimize excessive sound and vibration.

It is contemplated that the vacuum system 310' can comprise any suitable vacuum system, commercially available or otherwise. In one embodiment, the vacuum system 310' is connected to the second chamber 212' by a tube so that the vacuum system slightly reduces the pressure inside the volume of space inside the first chamber 112', the second chamber 212' and the tube connecting the two chambers. Preferably, during operation, the vacuum system 310' draws a volumetric flow rate that is generally equal to the volumetric flow rate of the cooling gas from the diffuser 118. In one exemplary but non-limiting embodiment, the vacuum system 310' can comprise a Leybold-Heraeus D60 roughing pump and RUVAC blower.

In the embodiment illustrated in FIG. 2, a cooling system 810 comprises a coolant tank 820, a pump 840, a valve 822, a tube 830, and two cooling jackets 850 and 852. In this embodiment, a coolant, such as for example, but without limitation, water, is circulated from the water tank 820 by the pump 840 through the tube 830 and the valve 822 into the cooling jackets 850 and 852 and back into the coolant tank 820 through the tube 830 and valve 822. The pump 840 can be connected to and obtain power from an electrical power grid through a conventional electrical power supply.

It is contemplated that the cooling system 810 can comprise any suitable cooling system, commercially available or otherwise. The cooling system 810 can use water, air, sound waves, evaporation, active refrigeration, or any other known method for controlling temperature. In one exemplary but non-limiting embodiment, the cooling system can comprise a commercially available water chiller known as a Neslab HX-300.

In the embodiment illustrated in FIG. 2, a video camera 162 is positioned to gather optical data through the window 160 and is supported by a camera support member 164 that is connected to the outer wall 122 of the first chamber 112'. The angle of the camera 162 is such that the camera 162 can capture video images of the heating element 612, the vaporizing material 910, as well as the quenching of the material 910. The camera 162, in this embodiment, is powered by batteries. In this embodiment, the camera is sensitive to visible light and has a lens with a focal length that can be adjusted by the user. The camera 162 records data on a conventional, commercially available, analog or digital video tape. Other video capturing devices can also be used.

It is contemplated that many alternatives can fulfill the function of the camera 162. Feedback can be provided in real time to the operator through a monitoring screen in communication with the camera 162. A computer can be configured to monitor the status of the first chamber 112' and provide feedback with which to adjust the various systems. The data can be obtained in digital or analog form: The camera can also be sensitive to radiation that is not in the visible range, such as infrared or ultraviolet radiation.

In the embodiment illustrated in FIG. 2, the controller 410' can be a single unit that is electrically or mechanically connected to each of the controllable systems of the generator 10'. The controller 410' can be connected to the vacuum system 310' by a wire 412. The controller 410' can also be connected to the camera by a wire 414. The controller 410' can further be connected to the cooling system 810 and pump 840 by a wire 416. The controller 410' can be connected to the material feeder 710' by a wire 418. The controller can be connected to the heating element 612 by a wire 420. The controller 410' can be connected to the cooling fluid delivery system 510' by a wire 422.

In some embodiments, the controller 410' is configured to obtain feedback from each of the controllable systems as well as send control information to those systems. The controller 410' also interfaces with an operator, who can input specific information and commands to the controller and controllable systems. The contemplated controller-operator interface can comprise visual displays such as dials, gauges, digital character displays, audio signals, light-emitting diodes, computer screens, liquid crystal displays, etc. The contemplated controller-operator interface can also include manipulable input devices such as knobs, levers, buttons, switches, keyboards, joysticks, trackballs, mice, touch-screens, etc.

It is contemplated that the controller 410' can comprise separate control modules, one for each of the controllable systems of the inventions. In other embodiments, the controller can be a single unit configured to communicate with and control each of the controllable systems of the generator 10'. The controllable systems of the generator 10' include, for example, but without limitation, the material feeder 710, the heater device 610', the cooling fluid delivery system 510', the cooling system 810, and the vacuum system 310'.

The controller 410' can comprise a computer system configured to perform the control functions. A computer control system can replace the operator by analyzing feedback data and adjusting the adjustable systems appropriately according to parameters determined concurrently or beforehand.

A method of generating nano-particles can comprise a material feeding process, a material vaporization process, and a cooling process that may comprise an introduction of a flow of cooling fluid to interact with the vaporized material. Optionally, the method can include drawing the vaporized material and cooling fluid using a vacuum system, storing, and collecting the nano-particles. One exemplary but non-limiting embodiment of a method of producing nanopowders generally comprises the steps of creating a material vapor stream in a first chamber 112' and converting the vapor into nano-particles using a plume of quenchant gas. Optionally, the method can include adjusting or controlling the speed of the material feeding process, adjusting or controlling the rate of material vaporization, adjusting or controlling the flow of cooling fluid, and adjusting or controlling the vacuum system. Adjustment can be in response to data obtained by a feedback system. Some examples and details of these steps and processes are described above. Further examples and details of each of these steps and processes are described below.

A method for generating nano-scale particles can comprise a material feeding process. The material feeding process can include introducing a raw material into a vaporization system. The raw material can be in solid or liquid form and may comprise ingots, pellets, powder, rods, wire, coils, bars, etc. The material feeding process can comprise advancing the raw material into close proximity with a vaporization system 610 at a controllable rate. Advantageously, the material feeding process can comprise allowing the raw material to flow into a thin layer over a stationary surface of the vaporization system 610 (wetting) before the raw material changes phase into a vapor.

The method can also comprise adjusting the feeding rate of the raw material so as to maintain a desired vaporization rate or a desired thickness of a thin layer of raw material on the heater device 610'. The desired feeding rate can be determined by observing flow of the vaporized raw material and cooling fluid. Advantageously, the method can comprise allowing liquid raw material to flow evenly over the stationary surface of the heater device 610'. Alternatively, the raw material may be allowed to flow over a convex surface of the heater device 610'. The raw material may be allowed to flow over a downwardly facing surface of the heater device 610'. The feed rate of the raw material may be limited such that only a thin film of raw material forms on the surface of the heater device 610'. The feed rate may be adjusted to limit the thickness of the film so as to minimize the formation of bubbles during the vaporization of the raw material. Optionally, the adjustments can be made by a person who observes the layer of raw material or the flow of raw material onto the heater device 610'. Alternatively, the adjustments can be made automatically by a system that responds to the feeding rate without need for human input. The adjustments can be accomplished through use of a single or multiple controllers 410'. Optionally, the method can comprise adjusting the feed rate of raw material to reduce or increase flow rate and/or turbulence of the flow of material vapor emanating from the heater device 610'.

Figure 4:
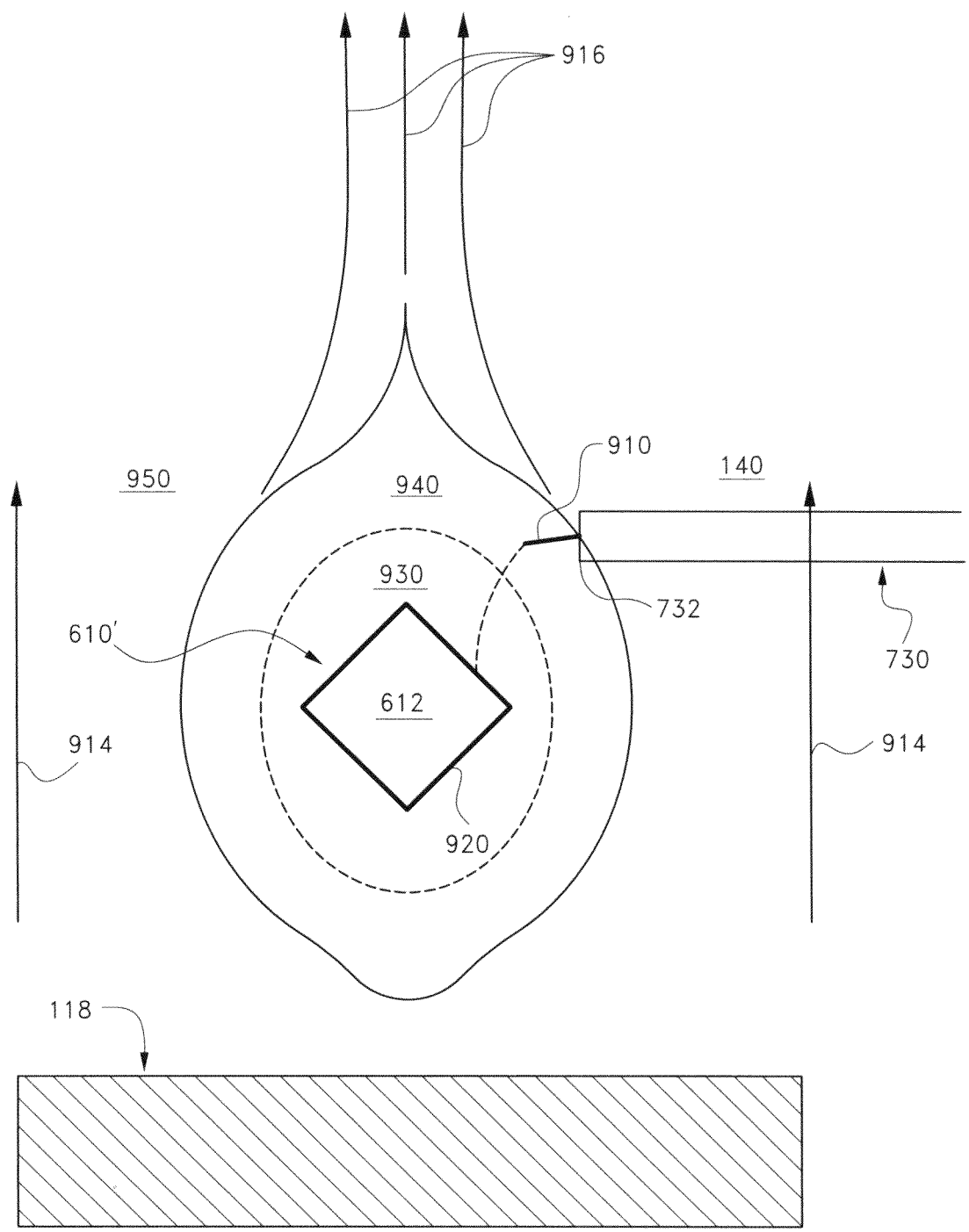

With reference to FIGS. 2 and 4, in one exemplary embodiment, the material feeder 710' can be activated, including supplying electrical power, such that the material 910 in the form of metal wire is fed from the spool 720 into the outside end 734 of the access tube 730 and moves toward the inner end 732 of the material feeder 710'. The material 910 eventually protrudes into the area 116 of the first chamber 112' just above the heating element 612. As the material 910 is fed through the access tube 730, it is heated by the heating element 612 until shortly after protruding from the end 910 of the access tube 730, the material 910 softens, bends downwardly toward the heating element 612, and melts into liquid form, dropping down onto the heating element 612. The material, upon contacting the heating element 612, quickly forms a thin and continuous layer 920, spreading out over the entire surface of the heating element 612, including the downwardly facing surfaces, and forms a thin, even, liquid layer 920 of material.

Figure 5:
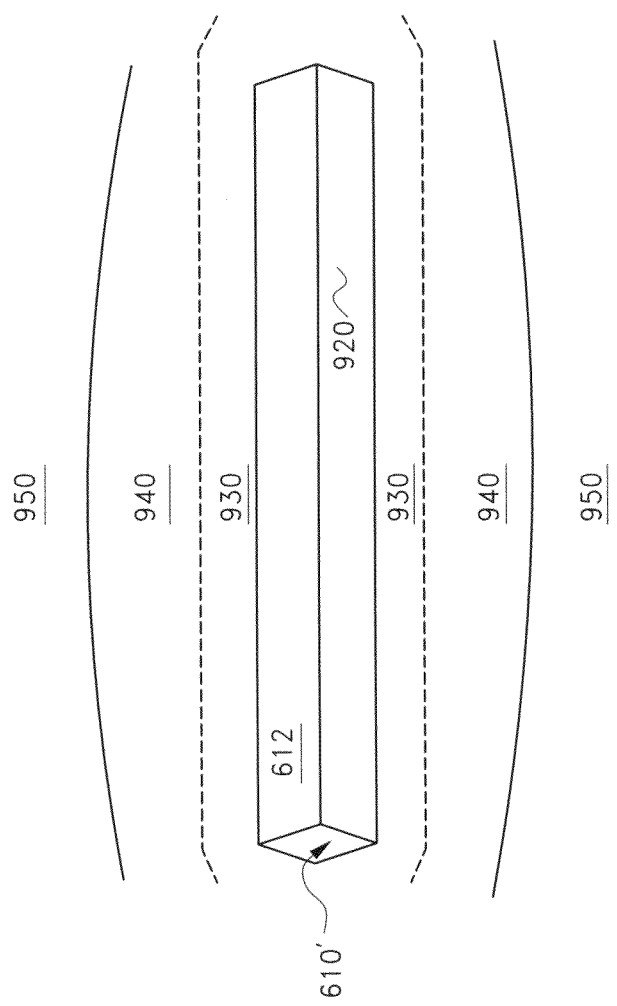

With reference to FIGS. 4 and 5, the thin layer 920 of liquefied material is illustrated as generally adhering to the heating element 612 in such a way that it flows freely along, across, and around the surface of the heating element 612 but without excessive dropping from the heating element 612.

The material 910 can be fed through the access tube 730 at a faster or slower rate, according to the desires of the operator or the parameters of the automated controller. If it is desired to make the layer 920 on the heating element 612 thicker, a higher throughput can be achieved by adjusting the controller 410' appropriately. Pooling of the material on the heating element 612 can be minimized by decreasing throughput of material 910 through the material feeder 710, and the process can be observed using the camera 162. Visually observing a portion of the zone 940 allows feedback and adjustment to be made to achieve desired conditions for nano-particle formation in the vicinity of the heating element 612.

A method for generating nano-scale particles can comprise a vaporization process. The vaporization process can include heating material until it vaporizes. Optionally, the vaporization process can include the material feeding process. For example, but without limitation, the vaporization process can comprise contacting a stationary surface of a heater device 610' with a raw material. An advantage is provided where the vaporization process includes vaporizing the material with a heater device 610' that does not induce a violently turbulent flow. For example, but without limitation, the heater device 610' may allow vapor to flow upwardly, in a laminar manner, from the heater device 610' under free convection. Optionally, the heater device 610' may allow vapor to emanate or flow away from the device under substantially free convection. Alternatively, the heater device 610' may allow vapor to flow in a substantially laminar manner. Optionally, the vaporization process may occur within a closed or partially enclosed chamber. Advantageously, the vaporization process occurs in conjunction with a material feeder process like that described above, which can supply raw or yet-to-be vaporized material to the vaporization device at an adjustable rate. Advantageously, the material feeding process can comprise allowing the raw material to flow into a thin layer over the stationary surface of a heater device 610' before the raw material changes phase into a vapor. Optionally, the vaporization process can be accomplished by a plurality of heater devices. The heater devices may be disposed in a chamber, spaced from and adjacent to each other. Alternatively, the material vapor can be created by a number of methods including resistance heating, hollow tube furnace heating or slot furnace heating.

The vaporization process can comprise the events described below. The gas molecules of the material separate from the thin liquid layer of material still present on the surface of the heating element 612 and emanate or move outwardly from the heating element 612 into the space surrounding the heating element 612 inside the upper area 116 of the first chamber 112'. This separation of gas phase molecules can be compared to boiling. The vaporized material molecules, in accordance with the principles of physics which govern fluid movement and convection currents, gently rise upwardly through the area 116 of the first chamber 112' toward the tube 150 at the top of the first chamber 112'. The particles in their vaporized, gaseous state have high energy, and they are better able to overcome the constant downward pull of gravity than are the surrounding, cooler molecules in the chamber. Thus, the vaporized material molecules undergo substantially free convection as they move upwardly through the first chamber 112'. This general convective movement of vaporized molecules is illustrated in FIG. 4 with the arrows 916. The general region occupied by the material vapor is illustrated in FIG. 4 as general region 930.

With reference to an exemplary but non-limiting embodiment illustrated in FIG. 4, an end-view of the heating element 612 is shown including a stylized illustration of the thin liquid layer 920 of material. As described above, the material layer 920 is heated by the heating element 612 to the point at which it changes phase from a liquid to a vapor, or gaseous phase. This phase change occurs inside a general zone 930 near the heating element 612, illustrated in FIGS. 4 and 5. Within the zone 930, the material in its vaporized form undergoes nucleation and growth, as the vaporized molecules encounter each other and interact to form nano-scale particles. As the nano-particles continue to float generally away from the heating element 612 through the zone 930 undergoing nucleation and growth, they enter into a zone 940, where they are more likely to interact with molecules of cooling gas.

Within the zone 940, the nano-sized clusters or groups of material molecules undergo a change of phase from gas to solid. This phase change may be from gas phase directly to solid phase in a process called reverse sublimation, or it may be through phase condensation. The state change results in nano-sized particles of material that in their new solid phase are less likely to adhere to other material particles; thus, the particles are able to retain their distinctive nano-scale size. It is the interaction between cooling gas and vaporized gaseous nano-sized material molecule groups that results in solid phase nano-scale material particles. The cooling fluid process and the interaction between quenchant gas and vaporized particles is described in more detail below.

Figure 7:
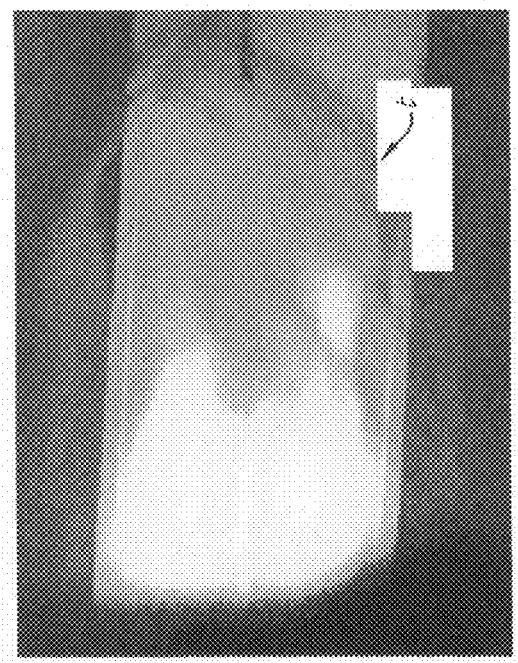

FIG. 7 is a close-up photograph view of the top of the heating element 612 inside the particle generator 10'. The heating element 612 extends laterally through the picture, and the yet-to-be melted or vaporized material is seen as a protruding wire at the right side of the picture. The functioning heating element 612 radiates both heat and light. In this photograph, the heating element 612 is coated with liquid material (nickel) that is undergoing vaporization.

A method for generating nano-scale particles can also comprise a cooling process. The cooling process can include injecting a flow of cooling fluid upwardly from a position below the vaporization device or heater element. An advantage is provided where the flow of cooling fluid is generally parallel to and in contact with the upward flow of the vaporized raw material. Advantageously, the flow of cooling fluid can be at the same or substantially the same velocity as the flow of vaporized raw material. Advantageously, the flow of cooling fluid can be in thermal communication with the flow of vaporized raw material. Preferably, the cooling fluid is introduced in such a way as to avoid creating a highly turbulent flow. For example, but without limitation, the flow of cooling fluid can be injected so as to create a laminar or substantially laminar flow. The cooling fluid can be any cooling or quenchant fluid, including any pure gas or mixture of inert or reactive gases (such as, for example, but without limitation, one or any combination of Helium, Hydrogen, Nitrogen, Argon, Carbon Dioxide, Oxygen, and the like). Materials that can be vaporized at elevated temperatures and/or reduced pressures can also be used as cooling gases. Those of skill in the art will recognize the wide variety of fluids and fluid mixtures that can be used as quenchant fluids. Optionally, the cooling gas may be injected into a closed chamber, providing the advantage of reducing the chances of ignition or explosion if volatile quenchant fluids are employed. The method can comprise passing the cooling fluid through a diffuser. Optionally, the diffuser comprises one or multiple blocks of sintered porous stainless steel. Advantageously, the cooling fluid can be introduced into a chamber from a diffuser located below the vaporization device.

Exemplary but non-limiting embodiments of a system for introducing cooling fluid into proximity with vaporized material are illustrated by FIGS. 2, 2B, 3, and 4. With reference to FIGS. 2, 2B, 3, and 4, the stable quenchant gas can be created by a number of methods, such as introduction of gas into the first chamber through one or multiple diffusers 118, 119. Advantageously, such diffusers can be placed near the bottom of the first chamber 112'. For example, in one exemplary but non-limiting embodiment illustrated in FIG. 4, the diffuser 118 through which the cooling gas flows is disposed below the heating element 612. The cooling gas flows upwardly as indicated by the arrows 914. Preferably, the shape and size of the diffuser 118 or diffusers as well as their distance from the source of metal vapor can be configured to generate a smooth flow of quenchant gas. A violently turbulent and/or chaotic plume can lead to broad particle size distributions. Advantageously, the diffusers can be porous sintered metal diffusers.

The method can also comprise adjusting the flow of cooling fluid so as to maintain a laminar or substantially laminar flow of the vaporized raw material and cooling fluid. Optionally, the adjustments can be made by a person who observes the interaction between the vapor and cooling fluid. Alternatively, the adjustments can be made automatically by a system that responds to the flow characteristics without need for human input. The adjustments can be accomplished through use of a single or multiple controllers as described above. Optionally, the method can comprise adjusting the flow of cooling fluid to reduce or increase flow rate and/or turbulence of the cooling fluid. Optionally, the method can comprise adjusting the flow of cooling fluid such that the flow of vaporized raw material rising from the heater device 610' flows generally in the shape of a flame of a candle.

Advantageously, the cooling or quenchant gas is introduced into the diffuser 118 by means of mass flow controllers to precisely meter the flow rate. The size of the nano-particles produced is determined by, among other things, the heat capacity of the quenchant gas, the chamber pressure, the rate of generation of the material vapor and the flow rate of the quenchant gas. Blending a mixture of Helium, Hydrogen, Nitrogen and/or Argon gases by use of multiple mass flow controllers or a mixing device configured to receive multiple gas flows and mix them together, can control the heat capacity of the quenchant gas. The mixing device can also be configured to control the mass flow of gases into and through the particle generator.

In one exemplary, but non-limiting embodiment, the gas flows from one or a plurality of pressurized gas tanks 520, is released from within the tank(s) through the valves 526 (upon opening of the valves 526 using the knobs 528), and flows outwardly from the pressurized tanks 520 through the tubes 530 into the mixer 540. The two tanks 520 contain two different kinds of gas that are blended and mixed together inside the mixer 540 to achieve desired cooling characteristics. The combined cooling gas is then allowed to pass through the pipe 550 into the lower region 114 of the first chamber 112' and through the diffuser 118, which is formed in one embodiment from porous sintered stainless steel. In this exemplary embodiment, the volumetric flow rate of the cooling gas can be about 1-5 liters per minute.

This lower region 114, as noted above, can also be embodied as illustrated by the plenum 114B in FIG. 2B. The gas is then allowed to travel through the diffuser 118, flowing generally upwardly from the lower region 114 to the upper region 116 of the first chamber 112'. The diffuser 118 causes the flow of cooling gas to be spread out evenly from the surface of the diffuser 118, such that the gas flow does not create violently turbulent currents or eddies and flows in a substantially laminar manner throughout the lower region 114 of the first chamber 112'.

The chamber pressure can be controlled by the vacuum pumps and is also affected by the mass flow of gases in the particle generator 10'. The mass flux of the metal vapor is controlled by the size, geometry and temperature of the heat source and depends on the metal being evaporated. The mass flow controller or controllers can precisely meter the flow rate of the quenchant gas.

As discussed above, and with reference to FIGS. 4 and 5, vaporized material emanates from the heater device 610' to occupy a general zone 930. The vaporized material undergoes convective movement as illustrated by the arrows 916. This vaporization and convective movement are concurrent with the flow of cooling gas described above. For example, while the material layer 920 is being vaporized by the heating element 612, and replacement material 910 continuously fed onto the heating element 612 by the material feeder 710, the operator optionally adjusts the controller 410' to begin or continue the flow of cooling gas from the cooling fluid delivery system 510'.

The cooling gas and the material vapor described above interact, and this interaction between cooling gas and vaporized gaseous nano-sized material molecule groups results in solid phase nano-scale material particles.

FIG. 4 includes an illustration of the spatial zone 940 where this interaction occurs. The flow of gas is illustrated in FIG. 3, which shows a cutaway view of the inside of the first chamber 112'. The heating element 612 is viewed end-on in FIG. 3 and the flow of gas is indicated by arrows. The gas flow, in this embodiment, is smooth and substantially laminar as the gas flows around and past the heating element 612 and upwardly toward the tube 150.

FIGS. 4 and 5 show the zones of interaction between the vaporized particles of material and the cooling gas in more detail. FIG. 4 shows a close-up, with more detail, of the heating element 612 inside the first chamber 112' shown in FIG. 3. In FIG. 4, the access tube 730 is shown feeding material 910 to the heating element 612.

FIG. 5 shows a top view of the same zones illustrated in FIG. 4. The schematic top view of FIG. 5 is similar to what would be seen by the camera 162 through the window 160 looking downwardly toward the heating element 612. FIGS. 4 and 5 indicate a general zone 950 where the cooling gas is flowing smoothly and generally in a laminar manner upwardly through the first chamber 112'. Arrows 916 in FIG. 4 illustrate the general upward flow of a stream of solid-phase, condensed nano-particles, moving upwardly through free convection combined with the subtle smooth movement of the flowing cooling gas.

As this cooling interaction occurs, the zone 940 is visible to the camera 162 looking through the window 160 of the first chamber 112' due to increased particle size and light from the heating element. It is the zone 940 that is visible as a plume within the first chamber 112', as shown in FIGS. 7 through 10 and illustrated in FIG. 4. The thin material layer 920 and the zones 930 and 940 are not drawn to scale, because they are so variable and often thin that such an illustration would be difficult. FIGS. 7-10 show the visual appearance of the heating element 612 glowing with a glowing ring therearound. The glowing ring corresponds to the zone 940. As shown in FIG. 4, the general zone 940 is visible, and is in the general shape of a candle flame.

FIGS. 7 through 10 illustrate exemplary but non-limiting examples of substantially laminar flows of metal vapor being quenched with a mixture of argon and helium as viewed through a window positioned above the heater device 610', looking downwardly at the heater device 610'. In addition to spreading out the flow of gas spatially, the diffuser 118 causes the gas to flow at a steady rate in time, with the rate subject to adjustment by the operator using the controller 410'. As the cooling gas flows upwardly through the diffuser 118 and into the upper region 116 of the first chamber 112', it flows around and past the heating element 612 and thermally communicates with the vaporized molecules of material.

Discernible in FIG. 7 are the zones of interaction, illustrated in FIGS. 4 and 5, between the vaporized particles of material and the cooling gas. The photograph shows the plume, or zone 940 generally toward the right of the photograph and enveloping the heating element. The plume is seen from the top and side. Above the heating element 612 in the photograph, the zone 940 is seen to be brighter than the black background. Directly in front of the heating element 612, however, the plume or zone 940 is seen to be generally darker against the backdrop of the glowing heating element. FIG. 7 also illustrates how thin the zone 940 can be in relation to the inner zone 930 and outer zone 950. Because the zone 940 is determined by the interaction between material vapor and cooling or quenchant gas, the visible plume can reveal information about the flow pattern of the cooling gas. In this photograph, the plume includes some minimal turbulence labeled "t" comprising waves, or undulating perturbations in the flow of cooling gas that helps define the zone 940. The flow of cooling gas as exhibited by FIG. 7, including the turbulence "t," is intended to be encompassed by the term "substantially laminar."

Figure 8:
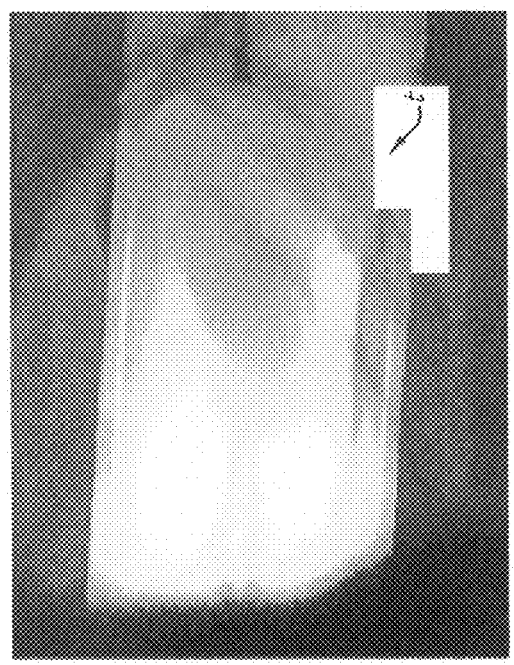

FIG. 8 shows a similar view to FIG. 7 and was taken at a different time. The flow of cooling gas as exhibited by FIG. 8 is also intended to be encompassed by the term "substantially laminar."

Figure 9:
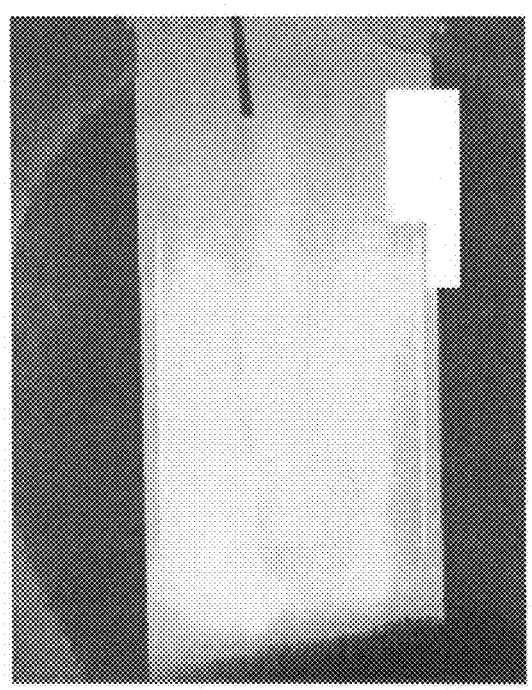
Figure 11:
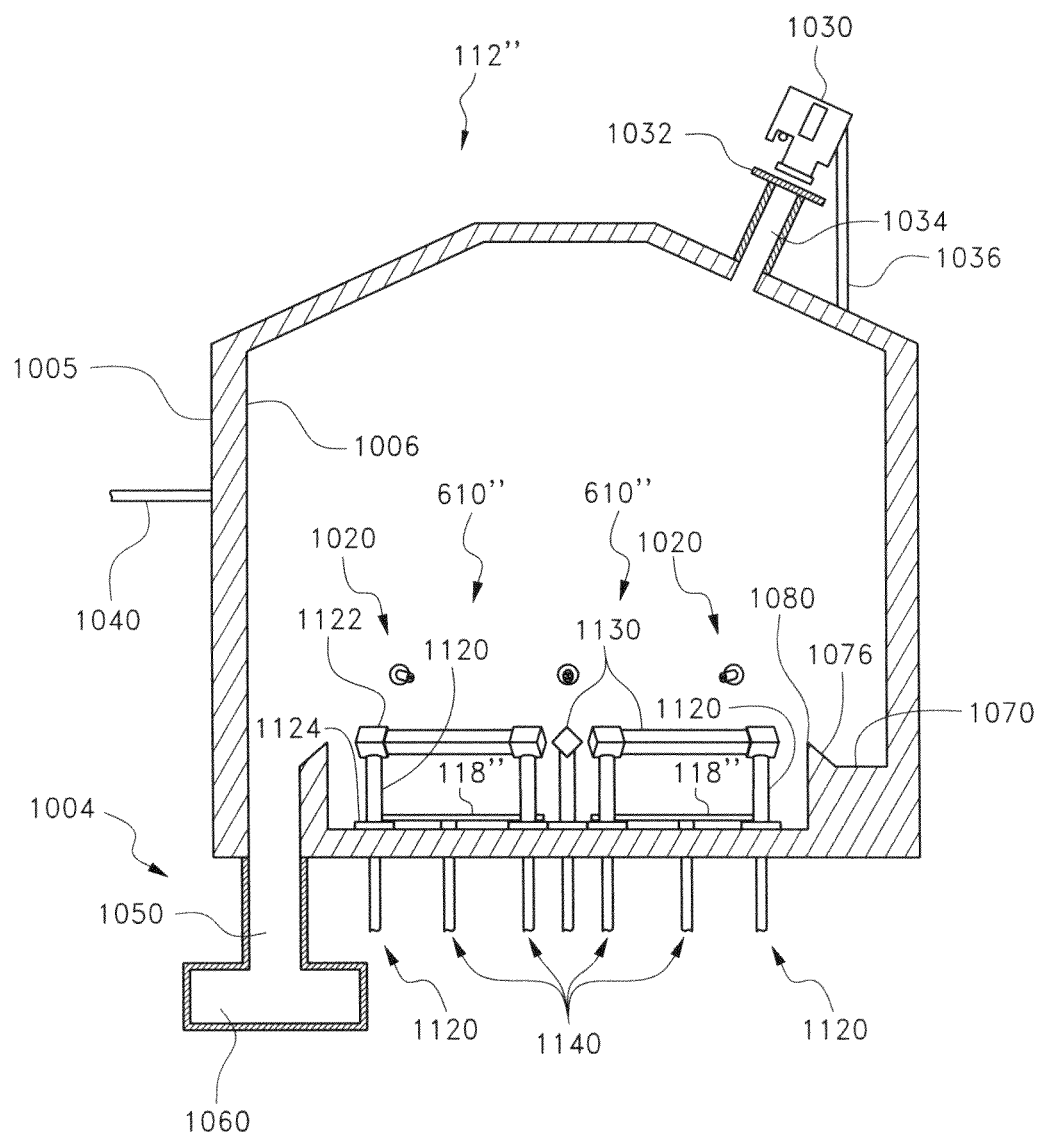

FIG. 9 shows a similar view to FIGS. 7 and 8, but shows the plume, or zone 940, as seen from directly above, rather than from above and to the side as in FIGS. 7 and 8. In FIG. 9, the flow of cooling gas is coming toward the camera and the candle-flame shape is less discernible. The zone 940 is seen at the perimeter of the photograph as a brighter, rounded, reddish color against the black background. The flow of cooling gas as exhibited by FIG. 9, including the turbulence "t," is also intended to be encompassed by the term "substantially laminar."

Figure 10:
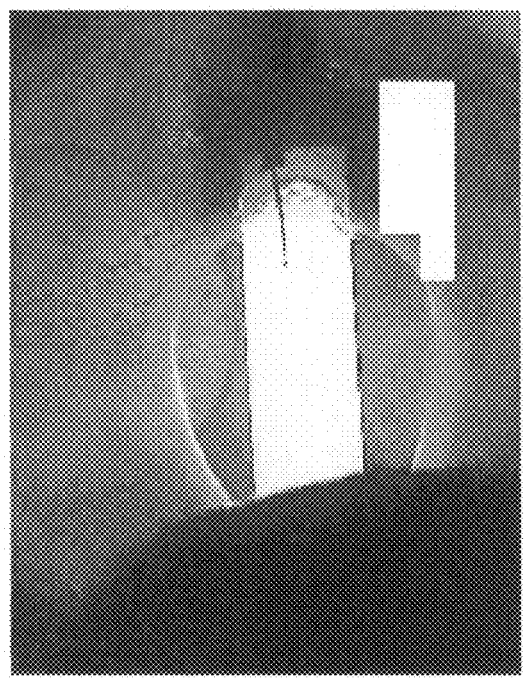

FIG. 10 is a photograph of the same heating element as seen in FIGS. 7, 8, and 9, showing the plume, or general zone 940, as seen from farther away than in FIG. 9, but also from above. The zones 930, 940, and 950 as illustrated in FIG. 5 are all seen in FIG. 10. The internal part of the material feeder 710' is also visible at the right of FIG. 10. The flow of cooling gas as exhibited by FIG. 10 is also intended to be encompassed by the term "substantially laminar."

A method for generating nano-scale particles can also comprise drawing the mixed flow of cooling fluid and nano-scale particles with a vacuum into a collection chamber. Optionally, the cooling gas and vaporized raw material may be drawn from a chamber under a low magnitude vacuum. The method can also comprise adjusting the vacuum system so as to maintain a laminar or substantially laminar flow of the vaporized raw material and cooling fluid. Optionally, the adjustments can be made by a person who observes the interaction between the vapor and cooling fluid. Alternatively, the adjustments can be made automatically by a system that responds to the flow characteristics without need for human input. The adjustments can be accomplished through use of a single or multiple controllers as described above. Optionally, the method can comprise adjusting the vacuum to reduce or increase flow rate and/or turbulence of the cooling fluid. Optionally, the method can comprise adjusting the vacuum system such that the flow of vaporized raw material and cooling fluid flows generally in the shape of a flame of a candle.

In one embodiment, the vacuum system 310' runs concurrently with all the other systems described above. As noted above, the vacuum system 310' can help create a mild flow of gas from the cooling fluid delivery system 510' through the first chamber 112' and second chamber 212', pulling the gas through the filter 222 and ultimately through the tube 330 into the vacuum system 310'. The vacuum system 310' lowers the pressure inside the first and second chambers 112' and 212'. In one exemplary but non-limiting embodiment, the vacuum system 310' lowers the pressure to approximately 1 to 10 Torr below the atmospheric pressure at the location of the particle generator, or approximately 760 Torr at sea level. Thus, the vacuum system 310' gently draws the cooling gas upwardly through the first chamber 112' and tube 150 into the second chamber 212'. In an exemplary but non-limiting embodiment, the flow rate of gas through the vacuum system 310' is about 1 to 10 liters per minute.

FIG. 6 shows a cross-sectional, end-on view of the second chamber 212' where the cross section also cuts through the tube 150. The tube 150 is shown as it enters the second chamber 212' at an opening 156, located at the end 154 of the tube 150. Arrows 982 indicate the direction of flow of the nano-scale particles 960 of solid material as well as the molecules 964 of cooling gas shown as stars in FIG. 6.

The gas molecules 964 and nano-particles 960 flow upwardly from the first chamber 112' through the tube 150 at approximately the same rate, and the gas molecules 964 and nano-particles 960 are entrained together in the flow. Arrows 984 illustrate how the rate of flow changes as the gas molecules 964 and nano-particles 960 go from the smaller cross-sectional volume tube 150 to the larger cross-sectional volume second chamber 212'.

As the rate of flow changes, the gas molecules 964 and the nano-particles 960 separate and the smaller gas molecules float generally upwardly from the opening 156 of the tube 150 into the upper region 230 of the second chamber 212'. In contrast, the nano-particles 960, upon exiting the tube 150 through the opening 156 of the second chamber 212', fall generally downwardly as indicated by arrows 988 into the collection region 240 of the second chamber 212'. The arrows 986 indicate the general upward movement 986 of the gas molecules relative to the general downward movement 988 of the solid material nano-particles 960. The gas molecules 964 do not remain permanently suspended in the upper region 230 of the second chamber 212', but move generally toward and through the filter 222, illustrated in FIG. 2, before moving into the frustroconical region 220 of the second chamber 212' and on into the tube 330 and the vacuum system 310'. The general flow of gas into the vacuum system 310' does not also move the solid material nano-particles 960 once the particles 960 have entered the second chamber 212' because the filter 222 is configured to allow gas molecules through while not allowing nano-particles through. From the nano-particle collection region 240 of the second chamber 212', the nano-particles can be gathered either concurrently while the system is still operating or after the nano-particle formation system has been turned off.

The method can also comprise adjusting or setting the temperature of the vaporization system or heater device 610' so as to maintain a desired vaporization rate or a desired thickness of a thin layer of raw material on the heater device 610'. The desired temperature can be determined by observing the flow of the vaporized raw material. Optionally, the adjustments can be made by a person who observes the layer of raw material or the flow of raw material into the vaporization system. Alternatively, the adjustments can be made automatically by a system that responds to the temperature without need for human input. The adjustments can be accomplished through use of a single or multiple controllers as described above. Optionally, the method can comprise adjusting the temperature of the heater device 610' to reduce or increase the temperature and/or rate of emanation of material vapor emanating from the vaporization device. Optionally, the method can comprise adjusting the flow of cooling fluid such that the flow of vaporized raw material rising from the heater device 610' flows generally in the shape of a flame of a candle. The method can comprise setting the temperature of the heater device 610' such that the liquid raw material undergoes phase change and is emitted as a vapor generally uniformly from a surface of the heater device 610'.

In an exemplary but non-limiting embodiment, with continued reference to the embodiment illustrated by FIG. 2, one method of using the systems and apparatus described is to first turn on electrical power to the heating element 612 so that the heating element 612 attains a temperature of about 900 degrees Celsius, and begins to give off visible light. Optionally, the camera 162 can be used to capture the appearance of the heater device 610' and/or record the operation thereof. Concurrently, the cooling system 810 can be activated.

Using a described embodiment, viewing the particle formation process through the window 160 of the first chamber 112' allows the operator to adjust the various controllable systems and observe the effect of those adjustments on the size and shape of the zone 940. For example, but without limitation, the gas flow from the cooling fluid delivery system 510' can be adjusted to increase or decrease the flow rate so that the flow of gas matches and is entrained with the upward convection of the vaporized material particles. Also affecting the flow rate of cooling gas is the vacuum system 310' which preferably generates a gentle pressure differential, urging the cooling gas and nano-sized particles to move upwardly through the tube 150 into the second chamber 212'.

The shape of the zone 940 that is glowing and emitting light to the camera 162 can indicate to the operator what kind of particle size and uniformity is being created inside the first chamber 112'. Another controllable system that can be adjusted by the operator is the material feeder 710.

Concurrent with the operation of the material feeder 710, cooling fluid delivery system 510', the activation of the heating element 612, and the operation of the camera feedback system 162, the vacuum system 310' and the cooling system 810 are, in one embodiment, in constant operation. The operator optionally activates these systems either a short time before or a short time after activating the other systems already described. The cooling system 810 continuously pumps water from the water tank 820 through the valve 822 and the tube 830 into the cooling jackets 850 and 852 that are attached to the outer surface of the walls 122 and 124 of the first chamber 112'. The flow of water through the tube 830 is multi-directional as the pump 840 moves cooled water into the cooling jackets and pumps warmer water out of the cooling jackets through the tube 830. The water, once pumped into the cooling jackets 850 and 852, circulates freely throughout the cooling jackets 850 and 852, constantly transferring thermal energy away from the first chamber 112'. The valve 822 can be used to regulate the flow of cooling liquid into and out of the cooling jacket 850 and 852. The valve 822 and the pump 840 can both be controlled and regulated by the controller 410'.

FIG. 11 illustrates a cross-sectional view of a modification of the chamber 112, identified generally by the reference numeral 112". Some of the components described below in association with the chamber 112" are identified with the same reference numerals used in the above description of the nano-particle generator 10 or 10', however, a double prime (") has been added thereto. Although some of the components described below with reference to the chamber 112" are identified with unique reference numerals, those of ordinary skill in the art understand that many of those components are interchangeable with the corresponding components of the chambers 112 and 112' described above. Thus, the descriptions of some of those corresponding components are not been completely repeated below.

With continued reference to FIG. 11, the chamber 112" can be considered as forming part of a particle generation assembly 1002 and part of a collection assembly 1004. The chamber 112" can be roughly cylindrical with a raised top. The first chamber 112" can be hollow and can be airtight. The first chamber 112" can have an outer wall 1005 and an inner wall 1006. The first chamber 112" can be constructed of stainless steel, although other metals, such as aluminum can be also used.

At least one material feeder 1020 can be disposed on the inner wall 1004 of the first chamber 112". The embodiment of FIG. 11 has five material feeders 1020, although other numbers of feeders 1020 can also be used. The material feeders 1020 illustrated in FIG. 11 can be configured to feed, into the chamber 112", any type of vaporizable material, such as, for example, but without limitation, iron, manganese, silver, cobalt, nickel, copper, palladium, any other metals from groups 3-12 on the periodic table, as well as select elements from groups 13-15, and the Lanthanide series, in addition to an alloy of two or more materials.

A video camera 1030 can be positioned on an upper portion of the first chamber 112". The video camera 1030 can be mounted to face through a window 1032 and down an observation port 1034 into the first chamber 112". The video camera 1030 can be mounted on a camera support member 1040. The video camera 1030 can be any visual observation tool. A video camera 1030 is used in the illustrated embodiment.

A tube 1040 can be in fluid communication with the interior of the cooling jacket 1004. The tube 1040 can be configured to provide a cooling fluid to the cooling jacket, which can be used to regulate the surface temperature of the first chamber 112"

The first chamber 112" can also have a lower surface inside the cylindrically-shaped body. This surface is along the outside perimeter of the bottom of the first chamber 112" as illustrated. The surface can have a raised ledge 1070, an inclined plane 1076, and an upper edge 1080. The chamber 112" can also have at least one passageway 1050 extending downward through the raised ledge 1070 and out of the first chamber 112". The passageway 1050 can lead to a second chamber 1060.

The second chamber 1060, as illustrated in FIG. 11, can also be constructed of a metal such as stainless steel, and can have any shape. The second chamber 1060 can include a vacuum system (not shown), such as the vacuum system 310, 310', for withdrawing nano-particles from the first chamber 112" and into the second chamber 1060. The passageway 1050 and the second chamber 1060 can be considered as forming part of the collection assembly 1004. In some embodiments, the second chamber 1060 can be used to hold cooled nano-particles.

A vaporization system 610" can be disposed within the first chamber 112". The vaporization system 610" can be comprised of a heating element 1130 and a supporting structure. The heating element 1130 can be held in place by mounting brackets 1122.

The mounting brackets 1122 can be raised from a floor of the first chamber 112" by supporting struts 1120. The struts 1120 can be fixed to the floor of the first chamber 112" with a platform assembly 1124. The supporting struts 1120 can be hollow. In the illustrated embodiment, the supporting struts 1120 house electrical connectors 1126 between the heating element 1130 and exterior of the first chamber 112". However, other configurations can also be used.

The chamber 112" can include one or a plurality of vaporization systems 610". The embodiment illustrated in FIG. 11 has five evenly dispersed vaporization systems 610". The five vaporization systems 610" illustrated in FIG. 11 are placed with a common center at the center of the first chamber 112".

Each of the vaporization systems 610" is arranged so as to extend in a generally radially outwardly direction from a center area of the first chamber 112", towards the wall of the first chamber 112". The vaporization systems 610" can be evenly spaced around the floor of the first chamber 112". Although five vaporization assemblies are illustrated in FIG. 11, fewer or more may be used in a particle generation assembly 1002. For example, the first chamber 112" can include 12 or more vaporization systems 610".

The heating elements 1130 can be resistive heating elements, however, other types of heating elements can also be used. With a resistive heating element such as the elements 1130, when a voltage is supplied thereto, they generate heat. The heating elements 1130 are capable of generating sufficient heat to vaporize the material supplied by the material feeders 1020.

As noted above, electrical connectors 1140 for the heating elements 1130 can be provided through the hollow support struts 1120. The electrical connectors 1140 can pass through the floor of the first chamber 112" and extend downwardly from the first chamber 112". The voltage of the electricity provided by the electrical connectors 1140 to the heating elements 1130 can be varied along with other electrical transmission properties by a control unit (not shown).

One or a plurality of diffusers 118" can be disposed beneath the heating elements 1130. In some embodiments, the diffusers 118" can be shaped into radial segments where each segment is disposed lower than and adjacent to a heating element 1130. Further, in some embodiments, the diffusers 118" can be generally wedge or pie-shaped.

A cooling gas can be provided to the diffusers 118" by cooling gas pipes 1140. The cooling gas pipes 1140 can extend downwardly from the diffusers 118", through the floor of the first chamber 112", and to cooling fluid delivery system (not shown), such as the cooling gas delivery system 510.

Figure 12:
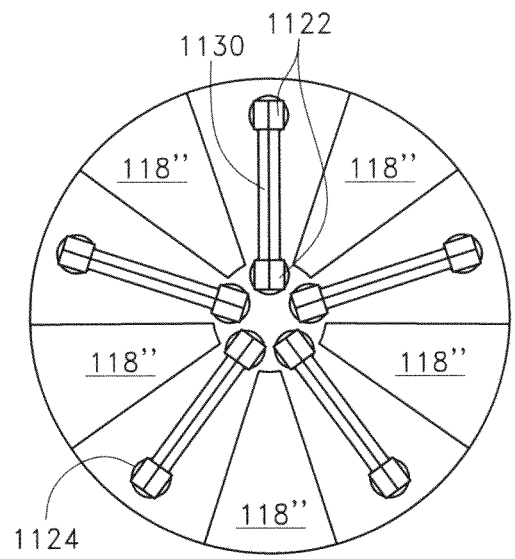
Figure 13:
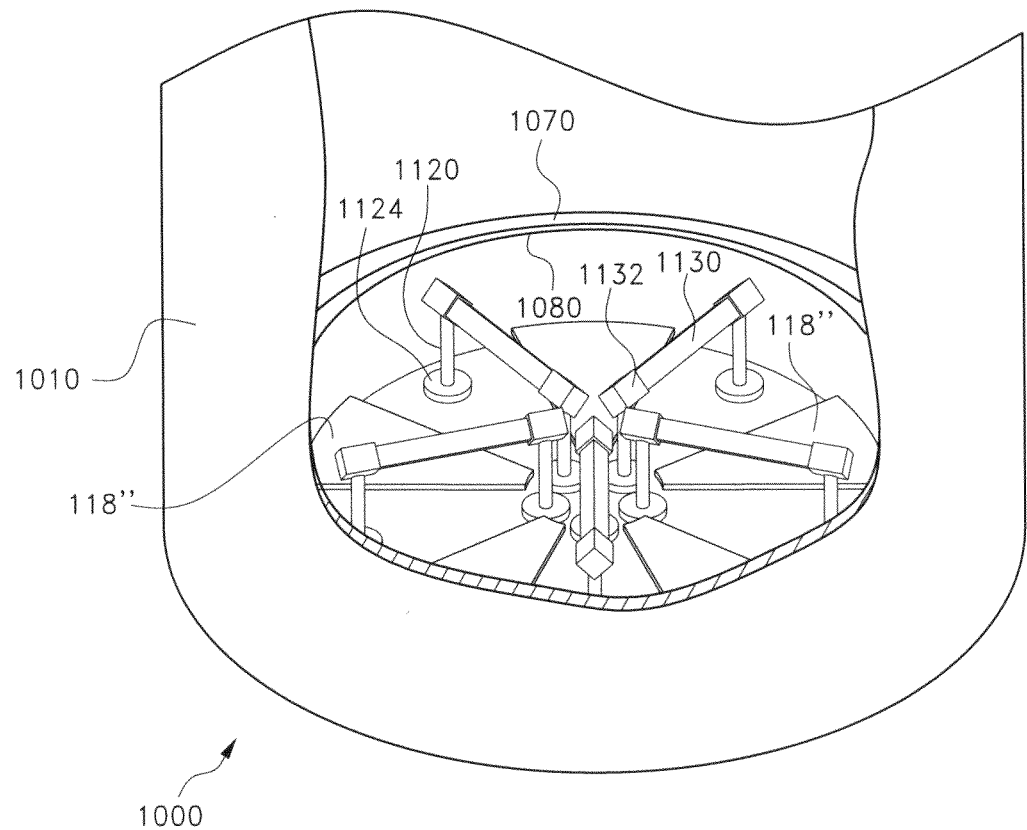

FIG. 12 is a top plan view of the inner region of the floor of the first chamber 112" within the upper edge 1080. In the embodiment illustrated in FIGS. 12 and 13, the vaporization systems 610" are equally spaced around the central area. The diffusers 118", as noted above, can be formed into shapes which approximate wedges having their narrow ends extending toward the central area of the floor of the chamber 112". The wedge or pie-shapes of the diffusers 118" increase in width as they extend farther from the center of the first chamber 112". As such, the diffusers 118" can provide a more even flow of cooling gas because they are more complimentary to the generally wedge or pie-shaped spaces between the vaporization systems 610".

Pressure within the first chamber 112" can be reduced below atmospheric pressure. The amount of pressure can be between one and ten torr. Pressure can be reduced by means of a vacuum assembly attached to the second chamber 1060. The vacuum assembly can be is controlled by a control unit (not shown) which can also control the voltage supplied to the heating elements 1130 as well as the flow of cooling gas.

During operation, material can be deposited on or exposed near the heating elements 1130 from the material feeders 1020. The material can vaporize when exposed near the heating elements 1130, or may melt or drop onto the heating elements 1130 and subsequently vaporize. Cooling gas can be provided through the diffusers 118".

As the material vaporizes off the heating element 1130, it begins to rise substantially due to natural or free convection. The flow of cooling gas through the diffusers 118" can be adjusted to provide a laminar or substantially laminar flow of cooling gas around each vaporization system 610". In some embodiments, the flow of cooling gas can be adjusted independently for each of the diffusers 118". As the vaporized material flows upwardly from the heating element 1130, the vaporized particles flow with the cooling gas upwardly and condense into multi-atomic nano structures.

The intermixed cooling gas and condensed structures are drawn through the passageway 1050 and into the second chamber 1060 by a vacuum system (not shown). The cooled nano-particles are then deposited in the second chamber 1060 for collection.

Figure 14:
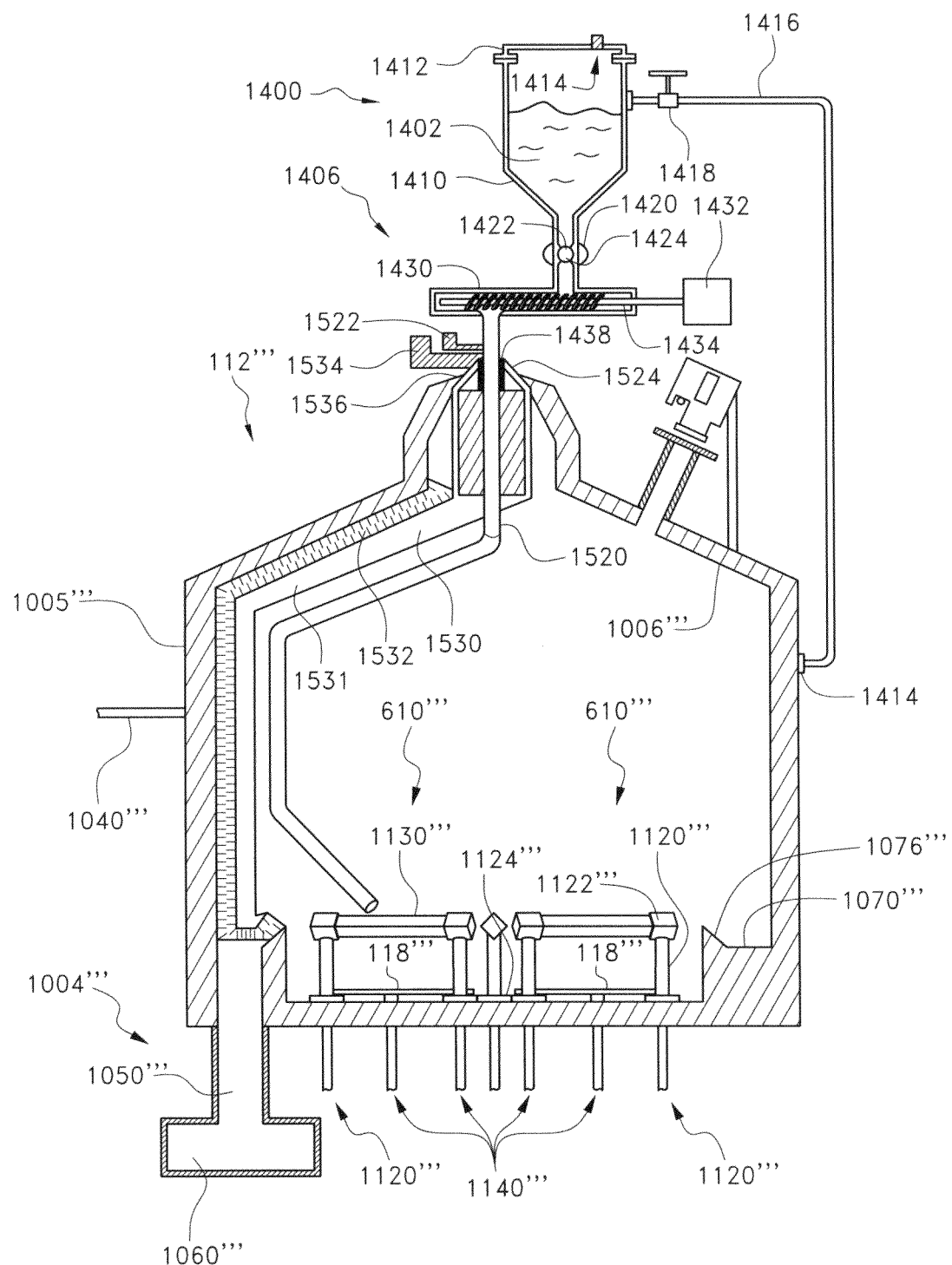
Figure 15:
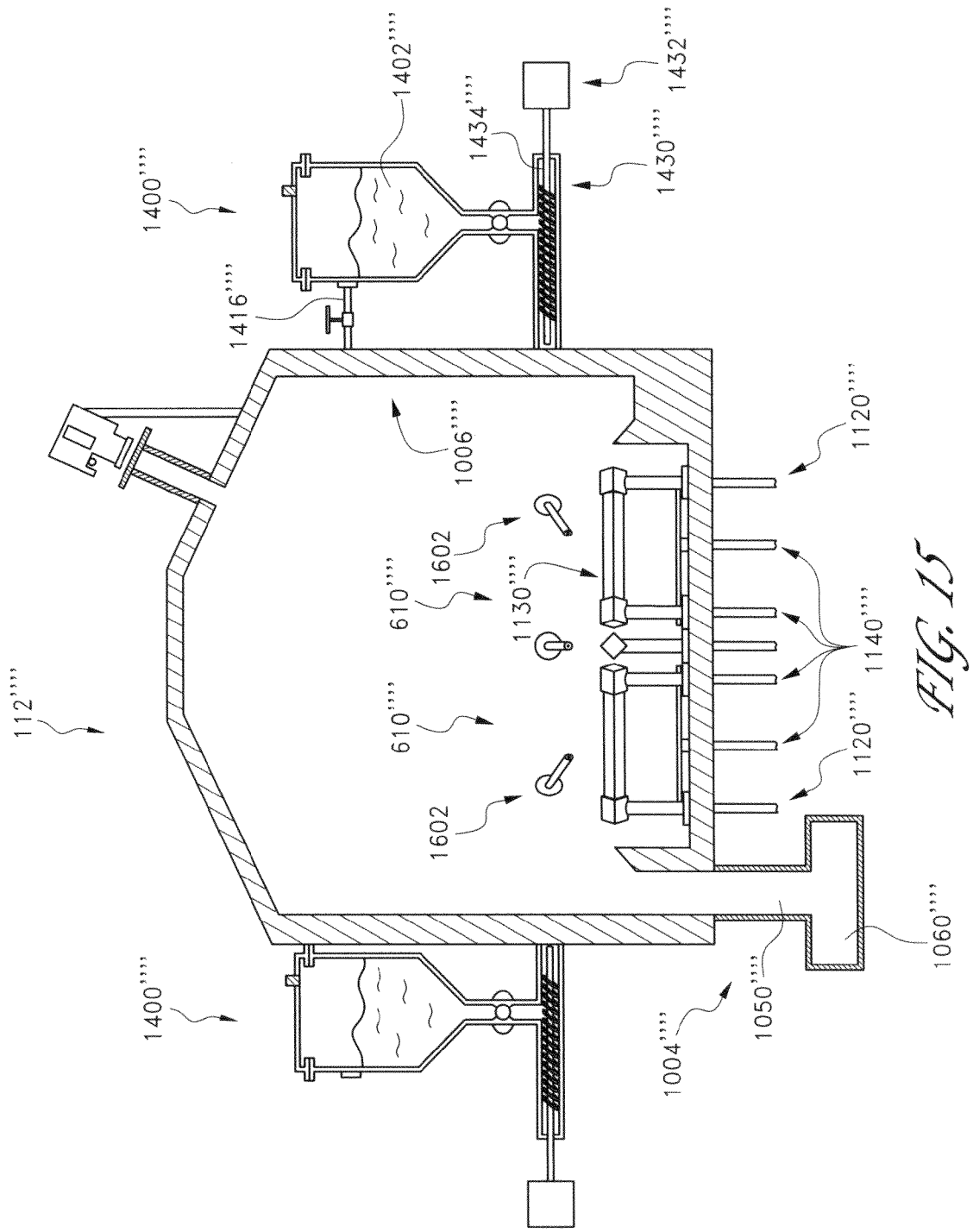

FIG. 14 illustrates a schematic cross-sectional view of a modification of the chamber 112, identified generally by the reference numeral 112'''. Some of the components described below in association with the chamber 112''' are identified with the same reference numerals used in the above description of the nano-particle generator 10 or 10', or the chamber 112" however, a triple prime (''') has been added thereto. Although some of the components described below with reference to the chamber 112' are identified with unique reference numerals, those of ordinary skill in the art understand that many of those components are interchangeable with the corresponding components of the chambers 112 and 112', 112", described above. Thus, the descriptions of some of those corresponding components are not been completely repeated below, or are completely omitted.

The chamber 112''' can include a material distribution tube 1520 configured to guide material, which in some embodiments can be a raw granulated material, toward the vaporization systems 610'. The material distribution tube 1520 can be disposed at least partially within the first chamber 112'''.

The tube 1520 can enter the chamber in the upper central portion of the chamber 112''' and can turn radially outwardly as it progresses downwardly towards the floor of the chamber 112'''. As it nears the inner wall 1006''' of the first chamber 112''', the material distribution tube 1520 turns downwardly and continues substantially parallel to the inner wall 1006''' of the first chamber 112'''. Before reaching the floor of the chamber 112''', the material distribution tube 1520 begins to extend inwardly towards the center of the first chamber 112'''. The material distribution tube 1520 ends before the level of the vaporization systems 610'''.

The material distribution tube 1520 does not extend vertically downwardly to or past the level of the vaporization systems 610'''. Rather, the material distribution tube 1520 ends slightly above the level of the heating element 1130'''. The tube 1520 can be made of a metal, and various metals, including stainless steel, can be used.

The material distribution tube 1520 can be composed of a metal having sufficient thermal qualities to resist deformation when disposed within the first chamber 112''' during operation of the heating elements 1130'''. Additionally, the distance between the end of the material distribution tube 1520 and the heating elements 1130''' can be sized to be sufficient to inhibit substantial thermal transfer between the heating elements 1130''' and the material distribution tube 1520.

The material distribution tube 1520 can also extend upwardly out of the first chamber 112''' in the upper central portion of the first chamber 112'''. The material distribution tube 1520 can be sealed by a rotatable seal 1524 which is configured to permit it to rotate about an axis extending through the center of the cylindrical first chamber 112'''.

A material distribution tube rotator handle 1522 can be disposed on the outside of the tube 1520 above the first chamber 112'''. By rotating the handle 1522, the material distribution tube 1520 can be rotated about the central axis of the first chamber 112'''. Accordingly, the material distribution tube 1520 can be positioned above any of the heating elements 1130'''.

A material distribution tube seal 1524 can be disposed on the outside of the material distribution tube 1520 in the vicinity of the top of the first chamber 112'''. The seal 1524 can be configured to inhibit fluid communication between the interior of the first chamber 112''' and the ambient atmosphere.

A brush member 1530 can be disposed within the interior of the first chamber 112'''. The brush member 1530 can extend downwardly from the upper central area of the first chamber 112'''. The brush member 1530, as illustrated, can be hollow at the top of the first chamber 1510 and can surround the material depositing tube 1520. Other configurations may be used, however, including those where the brush member 1530 does not surround the material distribution tube 1520.

In some embodiments; the brush member 1530 is not attached to the material distribution tube 1520 and both may rotate independently of each other. In some embodiments, however, the material distribution tube 1520 is coupled to the brush member 1530, and thus rotating the brush member 1530 rotates the material distribution tube 1520.

The brush member 1530 can extend downwardly and generally parallel to the slanted upper surface of the interior of the first chamber 112'''. As the slanted upper surface meets the horizontally circular interior surface 1006''' of the first chamber 112''', the brush member 1530 extends downwardly and generally parallel to the interior surface 1006'''. The brush member 1530 extends downward to a depth just short of the raised ledge 1070'''.

The brush member 1530 can be comprised of a brush member stem 1531 and brush filaments 1532. The brush filaments 1532 are disposed between the brush member stem 1531 and the interior surface 1006'''. In the illustrated embodiment, the filaments 1532 extend between the brush member stem 1531 and the interior surface 1350 and are in contact with the interior surface 1350 of the first chamber 1510.

The brush member filaments 1531 are configured to dislodge nano-particles from the inner surface 1006'''. In some embodiments, the filaments 1531 can be composed of copper or a copper alloy, any other material, preferably metallic. The brush member filaments 1531 can have a typical diameter of approximately 0.010", although they can be larger or smaller. The brush member 1530 can be disposed so that the filaments 1531 remain in contact with the interior surface 1350 of the first chamber 1510 at all positions while rotating within the chamber 112'''.

At the top of the first chamber 112''', a brush member seal 1536 can be disposed between an upper opening in the first chamber 112''' and the brush member 1530. The brush member seal 1536 can be configured to maintain atmospheric integrity of the interior of the first chamber 112''', for example, so as to inhibit fluid communication between the interior of the first chamber 112''' and the ambient atmosphere.

A brush rotator handle 1534 can be disposed outside the first chamber 112''', and above the brush member 1530. The brush rotator handle 1534 can also be formed integrally with the brush member 1530 or brush member stem 1531. The brush rotator handle 1534, as illustrated, can extend outwardly beyond the material distribution tube rotator handle 1522 and rotates around the same axis as the material distribution tube 1520.

A granular material feeder 1400 can be disposed above the chamber 112'''. The feeder 1400 can be comprised of a chamber 1410, chamber cover 1412, an equalizing tube 1416, a cut-off valve 1418, and a material transport assembly 1406. The chamber cover 1412 can be removable. The chamber 1410 can be composed of metal, such as stainless steel, although plastic or other suitable materials can be used. Bulk material 1402 can be disposed within the provider chamber 1410. As noted above, the bulk material can be a granular material. As such, the chamber 112''' can operate more economically because raw granular materials, such as vaporizable metals, are typically less expensive in the granular form. As used herein, the term granular is intended to cover any bulk material in particle forms, such as, for example, but without limitation, micron or larger-sized particles, spheres, pellets, flakes, chunks, grains, or filings. These materials can be fed through a tube, auger, or other conveyance onto the heating zone. Granular material can be a pure metallic substance or an alloy comprised of two or more elements to be vaporized concurrently.

The chamber cover 1412 can have a vacuum bleed valve 1414. The vacuum bleed valve 1414 can allow for communication between the interior of the chamber 1410 and the ambient atmosphere. The vacuum bleed valve 1414 can be operated when the vacuum within the provider chamber 1410 exceeds the vacuum bleed valve 1414 limit and results in the valve 1414 opening and permitting air from the ambient atmosphere to pass through the vacuum bleed valve 1414 into the provider chamber 1410. This helps ensure that any vacuum generated within the chamber 1410 does not prevent the granular material from flowing down into the tube 1520.

The chamber 1410 can also be in fluid communication with an equalizing tube 1416. The equalizing tube 1416 can extend between the chamber 1410 and the first chamber 112''', placing the provider chamber 1410 in fluid communication with the first chamber 112'''.

An equalization cut-off valve 1418 can be disposed along the equalizing tube 1416. The equalization cut-off valve 1418 can be closed to inhibit fluid communication between the chamber 1410 and the first chamber 112''' or opened to permit fluid communication. The equalizing tube 1416 can be in fluid communication with the interior of the first chamber 112''' through the equalization tube port 1419.

The chamber 1410 can be substantially cylindrical, tapering to a funnel-like shape near the bottom, and thus forms a "hopper". However, other shapes can also be used. Beneath the narrowed lower end of the chamber 1410, a material cut-off valve 1420 can be disposed.

The material cut-off valve 1420 can be comprised of a material cut-off valve chamber 1422, and a material cut-off valve member 1424. In the illustrated embodiment, the feeder 1400 is disposed off-center relative to the first chamber 112'''. However, other orientations can also be used.

A transfer tube 1430 can be disposed beneath the material cut-off valve 1420. The transfer tube 1430 can contain an auger shaft 1434, or any other device that can be used for metering a flow of granulated material.

The auger shaft 1434 can be connected to an auger motor 1432. The auger motor 1432 can be an electrical motor, pneumatic motor, or any other motor that can turn the auger shaft 1434. The auger shaft 1434 can be provided with a screw-like shape which extends from beneath the central axis of the chamber 1410 towards the central axis of the first chamber 112'''.

In the illustrated embodiment, the transfer tube 1430 can have an opening extending downwardly directly through the central axis of the first chamber 112'''. However, the transfer tube 1430 does not have to be co-axial with the central axis of the first chamber 112'''.

In some embodiments, the transfer tube 1430 can extend downwardly through any region of the top surface of the first chamber 112'''. An opening in a lower wall of the transfer tube 1430 connected with the material depositing tube 1520. The material depositing tube 1520 extends downwardly through the rotatable connection 1438.

With continued reference to FIG. 14, during operation, nano-particles can be produced in the chamber 112''' from bulk material 1402. The bulk material 1402 may be of any type of granular material from which production of nano-particles is desired. The chamber cover 1412 can be removed from the chamber 1410 so that the desired bulk material 1402 can be placed within the chamber 1410. The chamber cover 1412 can then be reattached to the chamber 1410.

Pressure within the first chamber 112''' is lowered to between about one and ten torr atmosphere. The pressure within the first chamber 112''' can be reduced by one to ten torr through the use of a pressure reducing tube 1040'''.

The equalization cut-off valve 1418 can then be opened, placing the chamber 1410 in fluid communication with the interior of the first chamber 112'''. In this way, pressure in the chamber 1410 and first chamber 112''' are equalized. Because the chambers have equal gaseous pressure, flow of the bulk material 1402 is unimpeded.

The material cut-off valve 1420 can then be opened to permit bulk material 1402 to fall down towards the material transfer tube 1430 solely under the influence of gravity or aided by a stirring or agitating mechanism (not shown). The material cut-off valve 1420 can be closed to inhibit transfer of bulk material 1402 from the interior of the chamber 1410 to the material transfer tube 1430. The bulk material 1402 arrives in the material transfer tube 1430 directly beneath the provider chamber 1410. The auger motor 1432 rotates the auger shaft 1434 as controlled by a control unit (not shown).

The auger shaft 1434 transports the material from beneath the chamber 1410 to directly above the material depositing tube 1520. The bulk material 1402 falls along the interior of the material distribution tube 1520 outward towards the inner surface inner wall 1006''' of the first chamber 112''', down parallel to the inner wall 1006''' of the first chamber 112''', and back towards the center of the first chamber 112'''. The bulk material 1402 then passes out the end of the material distribution tube 1520 and directly onto a heating element 1130'''.

By adjusting the material cut-off valve 1420, the flow rate of bulk material 1402 provided to the transfer tube 1430 can be controlled. In addition, the rotational speed of the auger shaft 1434 controls the feed rate of material provided to the material depositing tube 1520. In this way, the amount and rate of addition of bulk material 1402 to the heating elements 1130''' can be more finely controlled.

The material distribution tube rotator handle 1522 permits the material distribution tube 1520 to be oriented above any of the heating elements 1130'''. The rotatable connection 1438 permits the material distribution tube 1520 to be rotated by the material distribution rotator handle 1522 independent of the feeder 1400, specifically the tube 1520. The material distribution tube rotator handle 1522 can be indexed on the exterior of the first chamber 112''' to indices corresponding to locations of the heating elements 1130'''. Thus, when the material distribution tube rotator handle 1552 is adjusted to one index, the material distribution tube 1520 is directly over a heating element 1130'''. In this way, it is not necessary to observe the location of the material distribution tube 1520 to align the end of the material distribution tube 1520 with the heating elements 1130'''. Other methods of coordinating rotation of the material distribution tube 1520 with the heating elements 1130''' can also be used, including limits, stops, or other forms of feedback from within the first chamber 112'''.

As the vaporized particle and cooling gas mixture rises, natural convection within the first chamber 112''' causes it to flow outwardly along the inner surface 1006'''. During this process, some nano-particles can stick to the interior wall 1006'''.

The collection assembly 1004''' can include a vacuum system (not shown) which, when operated, draws the cooling gas and nano-particle mixture towards the collection assembly 1004'''. A nano-scale particle filter (not shown) can be disposed within the collection assembly 1004''' and allow the cooling gas mixture to be evacuated from the second chamber 1060''' while the filter causes nano-particles to fall to the floor of the second chamber 1060'''.

The brush member 1530 can be rotated by rotation of the brush member rotator handle 1534. As the brush member 1530 rotates, the filaments 1532 scrape the interior surface 1006'''. By scraping the interior surface 1006'', nano-particles that have been deposited on the interior surface 1006''' fall to the raised ledge 1070'''.

As shown in FIG. 14, the filaments 1532 can extend downwardly to contact the raised edge 1070''' and an inclined plane 1076'''. Accordingly, the brush member 1530 can be used to push nano-particles towards the opening in the raised platform which leads to the passageway 1050'''.

Further advantages can be achieved, in some embodiments, where the temperature of the heating elements 1130''' is cycled in accordance with the feeding of material from the tube 1520. For example some materials can be vaporized more efficiently if the temperature of the heating element is raised gradually to the vaporization temperature. There are some materials that can bounce off of the heaters 1130''' when they are fed from the tube 1520, if the heaters 1130''' are too hot.

For example, but without limitation, manganese tends to bounce off of a heater if the heater is left at a temperature of about 1900° F. which is a temperature that can be used to vaporize manganese. Thus, in some embodiments, if the heater 1130''' is reduced to about 1700° F., the granular manganese fed through the tube 1520 readily sticks to the heater 1130''', melts, and spreads around the other surface of the heater 1130''' in a desirable manner thereby advancing the vaporization process more readily. After the granular material has been fed on to the heater 1130''' as such, the temperature of the heater can be raised back to the vaporization temperature which, for manganese, can be about 1900° F.

As noted above, the heaters 1130''' can be controlled by a controller 410 (FIG. 1). Thus, in some embodiments, it can be advantageous for the heaters 1130''' to be connected to the controller 410 in such a way that the controller 410 can control the temperature of the heaters 1130''' independently from one another. As such, the controller 410 can lower and raise the respective temperatures of the heaters 1130''' as the tube 1520 sequentially delivers the raw materials to each of the heaters 1130'''.

FIG. 15 illustrates a schematic cross-sectional view of yet another modification of the chamber 112, identified generally by the reference numeral 112''''. Some of the components described below in association with the chamber 112'''' are identified with the same reference numerals used in the above description of the nano-particle generator 10 or 10', or the chambers 112'', 112''', however, a quadruple prime ('''') has been added thereto. Although some of the components described below with reference to the chamber 112'''' are identified with unique reference numerals, those of ordinary skill in the art understand that many of those components are interchangeable with the corresponding components of the chambers 112 and 112', 112'', 112''' described above. Thus, the descriptions of some of those corresponding components are not completely repeated below, or are completely omitted.

As shown in FIG. 15, a plurality of ports 1602 are provided on the inner surface 1006''''. A plurality of material provider assemblies 1400'''' are disposed around the outer wall 1005'''' of the first chamber 112'''', each communicating with one of the ports 1602.

Each material feeder 1400'''' is comprised of a chamber 1410'''', a chamber cover 1412'''', a material transport tube 1430'''', and an auger motor 1432''''. In this modification, the material transfer tube 1430'''' is in fluid communication with the interior of the first chamber 112'''' via the ports 1602.

The ports 1602 are located directly above the heater elements 1130''''. The material feeders 1400'''' are located around the exterior of the first chamber 112'''', such that the material transfer tube 1430'''' corresponding to each of the plurality of feeders 1400'''' enters the first chamber 112'''' above a heating element 1130''''.

During operation, the auger motor 1432'''' rotates the auger shaft 1434'''', which thereby transports the material from beneath the chamber 1410'''' through the material transport tube 1430''''. The bulk granular material 1402'''' then exits the material transport tube 1430'''' and falls through a port 1602 into the interior of the first chamber 112'''' and onto a heating element 1130''''. The vapor condensation process for producing nano-particles then proceeds as described above with reference to FIGS. 1-14.

Figure 16:
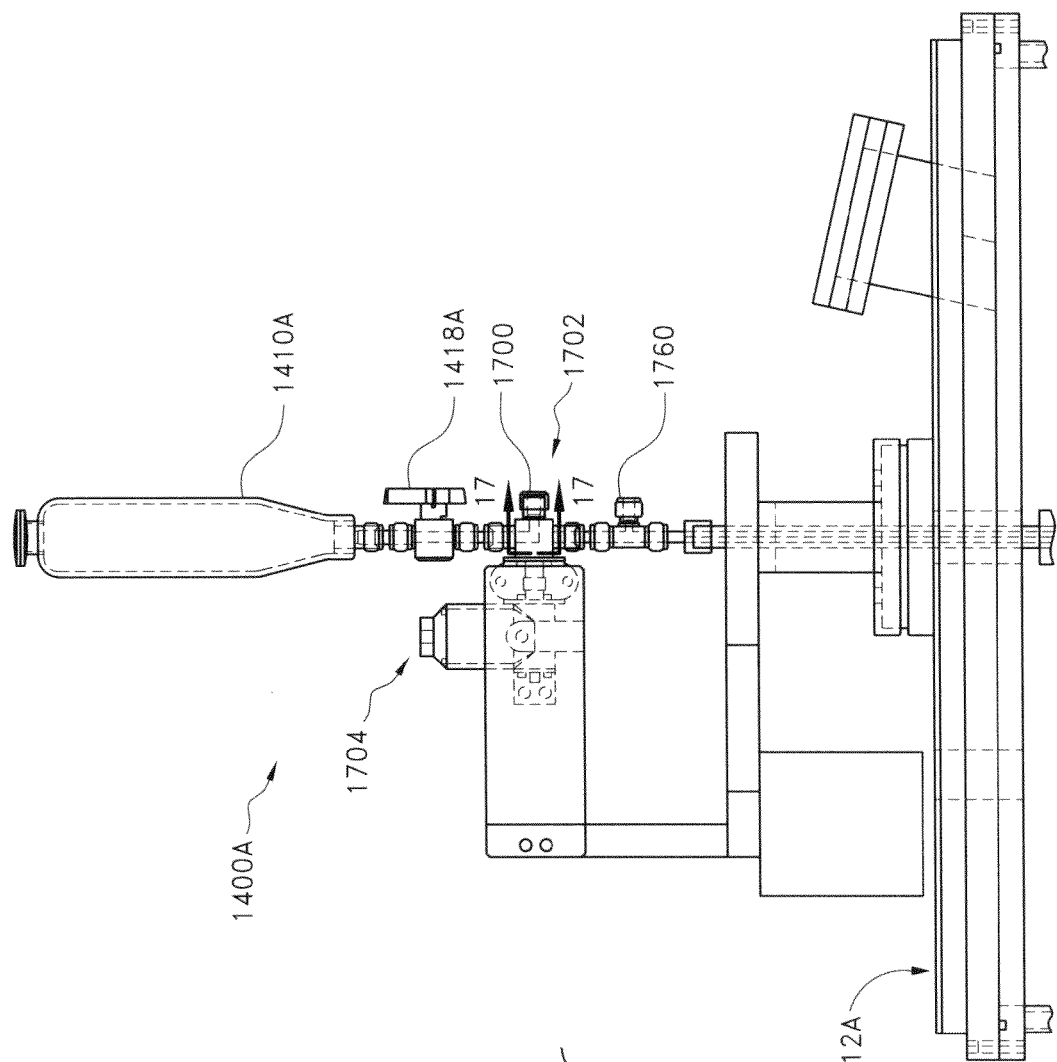
Figure 17:
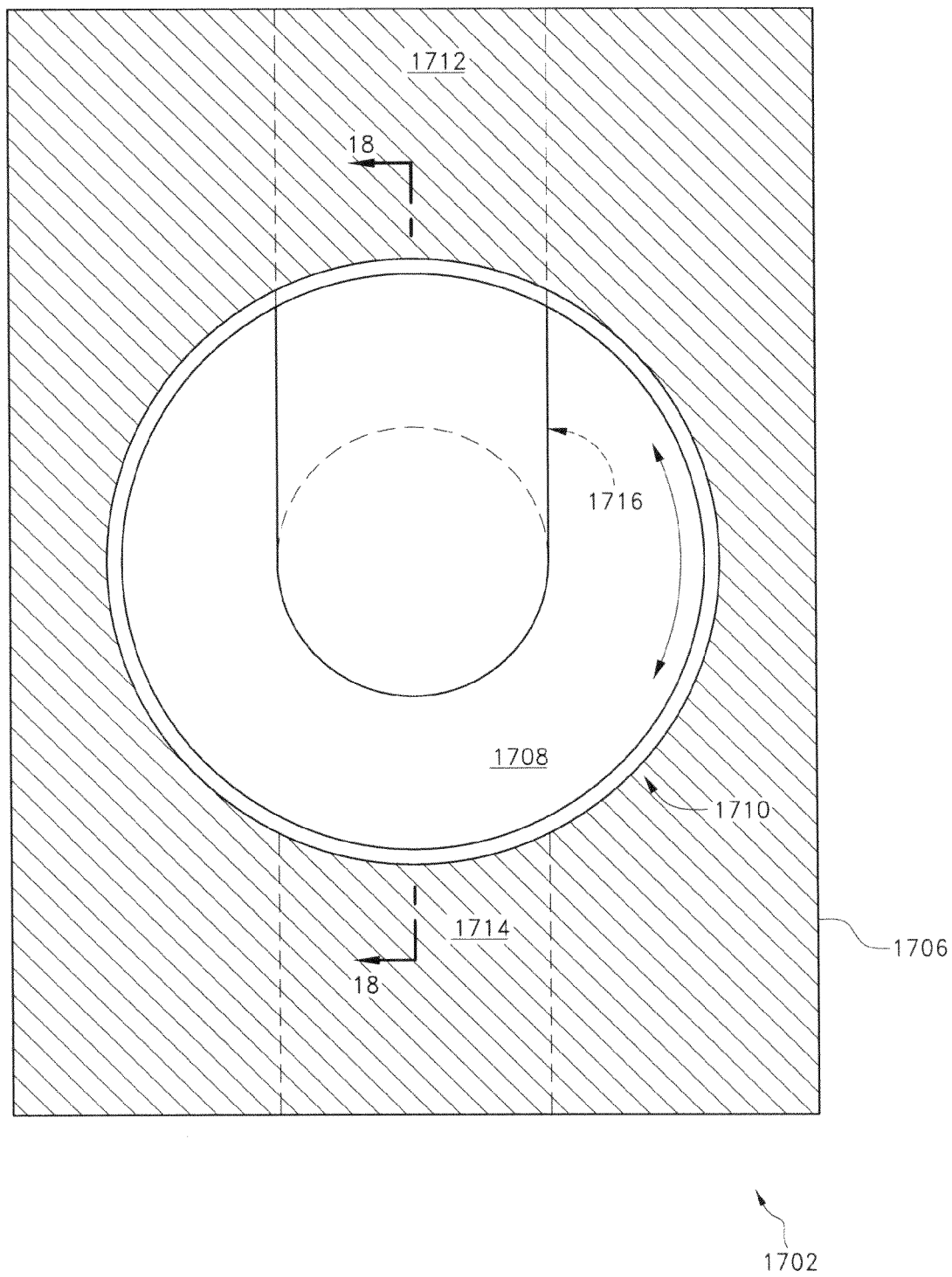
Figure 18:
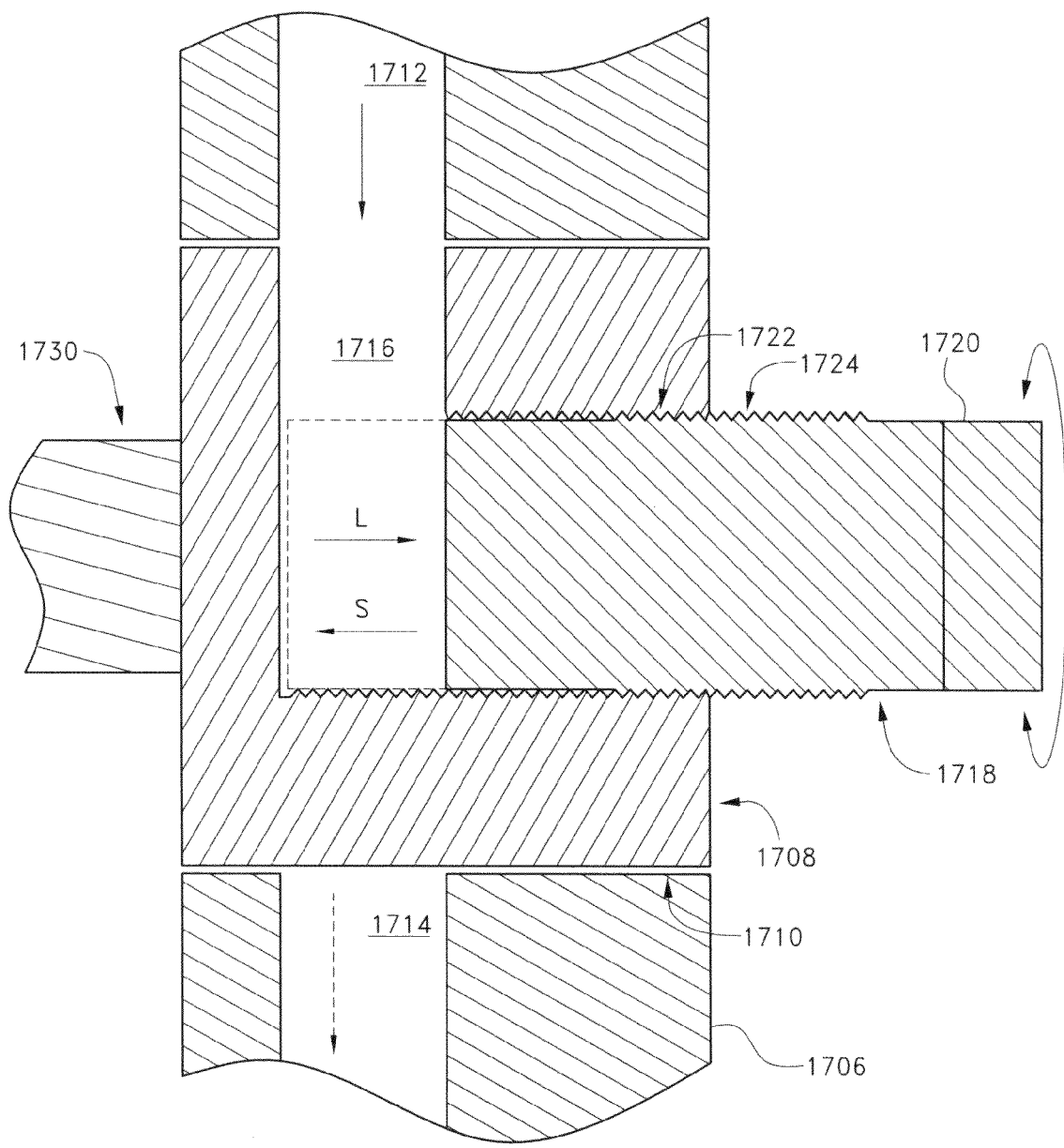

FIGS. 16-18 illustrate a modification of the granular material feeder illustrated in FIG. 14, identified generally by the reference numeral 1400A. Components of the granular material feeder 1400A are identified with the same reference numeral used in the above description of the granular material feeder 1400, except that an "A" has been added thereto. Although some of the components described below with reference to the granular material feeder 1400A are identified with unique reference numerals, those of ordinary skill in the art understand that many of those components are interchangeable with the corresponding components of the granular material feeder 1400 described above. Thus, the descriptions of some of those corresponding components are not completely repeated below or completely omitted.

The granular material feeder 1400A can include a metering device 1700 that is configured to meter a flow of material from the chamber 1410A into the reactor chamber 112A. In some embodiments, the metering device 1700 can be configured to periodically deliver predetermined amounts of granular material. For example, the metering device 1700 can include a valve 1702 and an actuator 1704 configured to operate the valve 1702.

With reference to FIG. 17, the valve 1702 can include a valve housing 1706 and a valve body 1708. In some embodiments, the valve body 1708 configured to be rotatable within the housing 1706. For example, the valve housing 1706 can include a symmetrical aperture 1710 configured to receive the valve body 1708.

Additionally, the valve housing 1706 can include an inlet port 1712 and an outlet port 1714. In some embodiments, the valve body 1708 can be configured to define a receptacle portion 1716.

With reference to FIG. 18, in some embodiments, the receptacle portion 1716 can be configured to have a variable size. In other words, the receptacle portion 1716 can be configured so as to allow a user to change the volume of the receptacle 1716.

In some embodiments, the metering device 1700 can include a movable member 1718 configured to change the volume of the receptacle 1716. For example, the movable member 1718 can be comprised of a generally cylindrical body 1720 that is configured to be movable into and out of a passage 1722 defined in the valve body 1708 that communicates with the receptacle 1716.

For example, in some embodiments, the external surface of the cylindrical body 1720 can include threads 1724 configured to engage with internal threads on the passage 1722. Thus, the body 1720 can be rotated relative to the valve body 1708 to cause the body 1720 to move inwardly (along the direction of arrow S) thereby reducing the volume of the receptacle 1716. Additionally, the body 1720 can be rotated in the opposite direction (in the direction of arrow L) causing the body 1720 to withdraw from the receptacle 1716 thereby enlarging the line of the receptacle 1716. However, this is merely an example of one type of arrangement that can be used for changing the volume of the receptacle 1716. Other configurations can also be used.

As noted above, the metering device 1700 can include an actuator 1704. In some embodiments, the actuator 1704 is connected to the valve body 1708 with a drive shaft 1730.

With reference again the FIG. 16, the actuator 1704 can include any type of actuator, such as, for example, but without limitation, solenoids, stepper motors, servo motors, or any electric, hydraulic, pneumatic or any other type of motor. Additionally, such actuators can be connected to the shaft 1730 (FIG. 18) or the gear reduction device or any other type of connection device. Further, depending on the type of actuator used, the metering device 1700 can include a device for determining the precise angular orientation of the valve body 1708 relative to the housing 1706.

For example, although not shown, the actuator 1704 can include an encoder wheel device configured to provide a signal, for example, in the form of a series of pulses, indicating the angular rotation of the valve body 1708 relative to the housing 1706. However, any type of device can be used. Further, although not shown, a separate electronic control unit or the controller 410 (FIG. 1) can be configured to control operation of the actuator 1704. Such programming of the controller can be achieved by one of ordinary skill in the art, and thus a further description of the programming and/or control of the actuator 1704 is not set forth herein.

In operation, the actuator 1704 can rotate the shaft 1730 so as to rotate the valve body 1708 between the upright position illustrated in FIG. 18 and a position in which the receptacle 1716 is upside down and thus communicating with the outlet port 1714 of the housing 1706. When the valve body 1708 is in the orientation illustrated in FIGS. 17 and 18, the receptacle 1716 is open to the inlet port 1712 and thus material from the chamber 1410A can fall downwardly into the receptacle 1716 until it is full. When the actuator 1704 rotates the valve body 1708, the receptacle 1716 rotates within the housing 1706, thereby closing off the inlet port 1712.

As the valve body 1708 is rotated further until the receptacle 1716 is essentially upside down from the orientation illustrated in FIGS. 17 and 18, the receptacle 1716 opens to the outlet port 1714. Thus, at that time, the contents of the receptacle 1716 flow downwardly out through the outlet port 1714, and down into the reactor chambers 112A.

As noted above, as desired, an operator can rotate the body 1720 to change the volume of the receptacle 1716. Thus, by moving the body 1720, the amount of material that is output through the outlook port 1714 can be changed by adjusting the position of the cylindrical body 1720.

After the contents of the receptacle 1716 have been emptied out through the outlet port 1714, the valve body 1708 can be rotated back towards its upright position and thus can be refilled by gravity, which draws the granular material down from the chamber 1410A into the receptacle 1716. Thus, this cycle can repeat as desired.

With reference to FIG. 16, the granular material feeder 1400A can include the cooling gas inlet 1760. The cooling gas inlet 1760 can be configured to allow a cooling gas should be injected into the conduit through which granular material passes from the metering device 1700 to the chamber 112A.

For example, in some embodiments, the cooling gas inlet 1760 can be a simple T-joint in the conduit connecting the metering device 1700 with the chamber 112A. As such, cooling gas can be injected along with the granular material flowing from the metering device 1700 into the chamber 112A. This can provide significant advantages.

For example, because the interior temperature of the chamber 112A can be elevated, granular material can be softened and can thus stick to the inside of the conduit connecting the metering device 1700 with the interior chamber 112A. Thus, by feeding cooling gas into this conduit, the granular material can be held at a lower temperature thereby reducing the likelihood that the granular material will melt or stick to the interior of the conduit.

Figure 19:
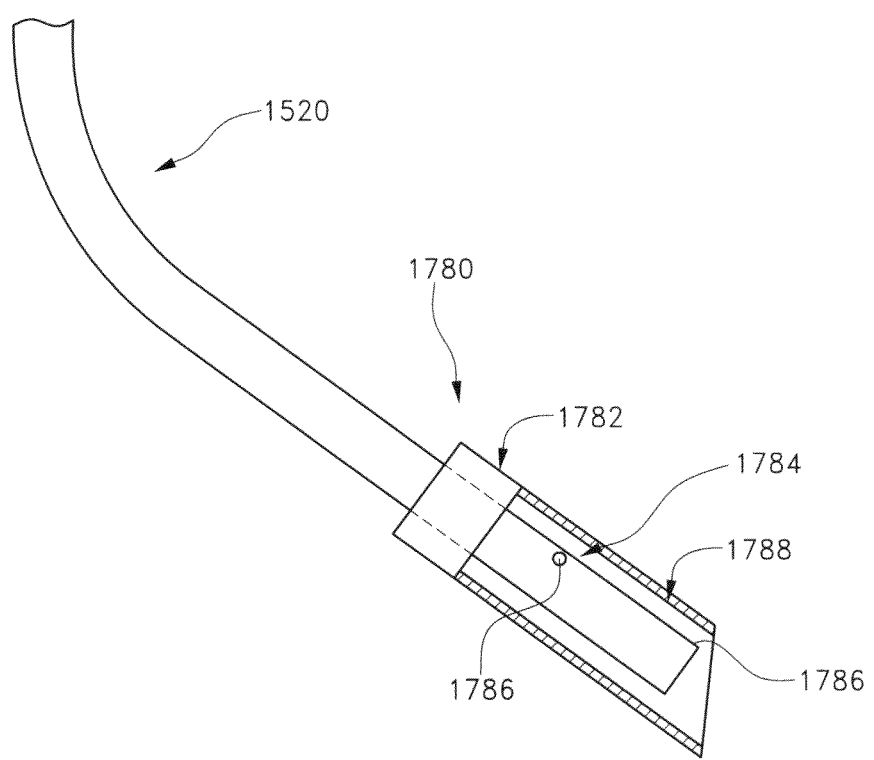

With reference to FIG. 19, the distribution tube can include an optional heat shield assembly 1780. The heat shield assembly 1780 can be configured to prevent the lower most end of the tube 1520 from becoming excessively heated. As such, the heat shield assembly 1780 can further prevent the likelihood that granular material fed through the tube 1520 can become softened and thus stick to the interior of the tube 1520.

In some embodiments, the heat shield assembly 1780 includes a sleeve 1782 that can fit over the end of the tube 1520. Further, in some embodiments, the sleeve 1782 can have an upper part that is fit onto the tube 1520 and a lower end sized so as to provide a gap 1784 between an outer surface 1786 of the end of the tube 1520 and the inner surface 1788 of the sleeve 1782. As such, radiation in the form of heat from the inside of the chamber 112A can be reflected by the sleeve 1782 and thereby prevent heating of the end of the tube 1520.

Further, in some embodiments, the tube 1520 can include an aperture 1786 allowing fluid communication from an interior of the tube 1520 into the space 1784. As such, where cooling gases fed through the tube 1520 along with the granular material, the cooling gas can flow into the space 1784 and thereby provide a further heat shielding effect in preventing the heating of the tube 1520.

The aperture 1786 can be of any size. However, it can be further advantageous if the aperture 1786 is generally smaller than the size of the particles of the granular material fed through the tube 1520. As such, the granular material is prevented from flowing out of the aperture 1786 and into the space 1784. However, because cooling gas molecules can be far smaller than the general micron size of the granular material fed through the tube 1520, the cooling gas can easily flow out of the aperture 1786 and into the space 1784 without carrying the micron size particles into the space 1784.

Figure 20:
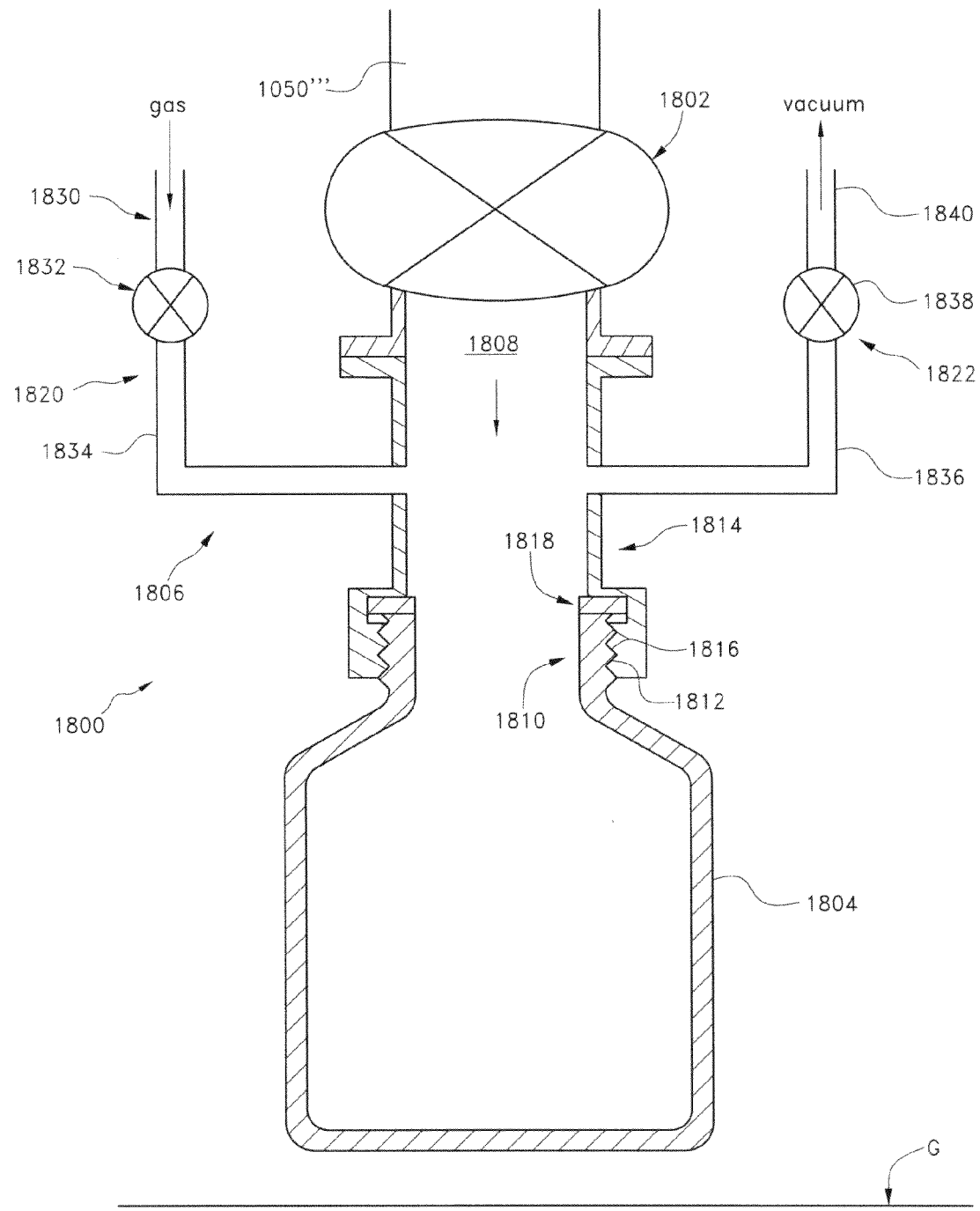

With reference to FIG. 20, any of the nano-scale particle generators described above with reference to FIGS. 1-19, can utilize the collection mechanism 1800 illustrated in FIG. 20. The collection mechanism 1800 can be connected to a discharge passageway 1050''' of the reactor 112''' on FIG. 14, or any other of the reactors illustrated in FIGS. 1-19.

The collection mechanism 1800 can include a valve 1802, a receptacle 1804 and an inerting system 1806.

The valve 1802 can be any type of valve configured to open and close the passageway 1050'''. When open, the valve 1802 allows the passage 1050''' to communicate with the collection passage 1808. The collection passage can be considered as forming a discharge port. Thus, when the valve 1802 is open, nano particles from the passageway 1050''' can flow downwardly through the collection passage 1808 into the receptacle 1804. In some embodiments, the valve 1802 is configured to, when closed, provide an airtight seal, preventing all flow of atmospheric air into or out of the passageway 1050'''.

The receptacle 1804 can be any type of receptacle. In some embodiments, the receptacle 1804 can be a glass container having a mouth portion 1810 which can include external threads 1812. However, other configurations can also be used.

A lower portion or outlet portion 1814 of the collection passage 1808 can include internal threads 1816 configured to engage the external threads 1812 on the receptacle 1804. In other embodiments, the lower portion 1814 can include a quick-release device (not shown) configured to releaseably engage an upper portion of the receptacle 1804. Additionally, a gasket 1818 can be disposed between the lower end 1814 of the collection passage 1808 and an upper surface of the mouth 1810 of the receptacle 1804. As such, the gasket 1818 can help provide a gas-tight seal between the receptacle 1804 and the passageway 1808.

The inerting system 1806 can be configured to displace all or substantially all of the atmospheric air or oxygen from the receptacle 1804 and the passage 1808 when the receptacle 1804 is attached to the passage 1808. For example, in some embodiments, the inerting system 1806 can include an inert gas supply assembly 1820 and a gas discharge assembly 1822.

In some embodiments, the inert gas supply 1820 can be configured to supply any type of inert gas. In some embodiments, the inert gas can be argon. However, any other inert gas can be used, depending on the material being generated in the associated reactor. In some embodiments, the inert gas supply 1820 can include an inert gas supply pipe 1830, an inert gas supply control valve 1832, and an inert gas supply conduit 1834 connecting the valve 1832 to the collection passage 1808. Additionally, in some embodiments, the conduit 1834 can be connected to the passage 1808 at a position between the valve 1802 and the lower end 1814.

The evacuation assembly 1822 can include an evacuation conduit 1836, an evacuation control valve 1838, and an evacuation pipe 1840. The evacuation pipe 1840 can be connected to any vacuum source. For example, the evacuation pipe 1840 can be connected to a vacuum system 310 (FIG. 1) configured to generate a vacuum within a container receptacle 1804 that is equal to the vacuum within the associated reactor. Additionally, in some embodiments, the conduit 1836 can be connected to the passage 1808 at a position between the valve 1802 and the lower end 1814.

During operation, for example, when attaching the receptacle 1804 to the passage 1808, the inert gas supply valve 1832 can be left open, thereby allowing an inert gas, such as argon gas, to flow freely through the inert gas supply conduit 1834 and into the passage 1808. In some embodiments, the vacuum control valve 1838 can be closed. Thus, the inert gas from the inert gas supply conduit 1834 can fill the passage 1808 and fall downwardly through the lower end 1814 of the passage 1808. In some embodiments, the receptacle 1804 can be left detached from the lower end 1814 but in close proximity, thereby allowing inert gas to flow down into the interior of the receptacle 1804, thereby displacing the oxygen that may be left therein.

After the oxygen has been sufficiently displaced out of the receptacle 1804, the mouth 1810 of the receptacle 1804 can be engaged with the lower end 1814. For example, the threads 1812 on the other surface of the mouth 1810 can be engaged with the internal threads 1816 until the upper end of the mouth 1810 presses against the gasket 1818 sufficient force to create a leak-tight seal.

After the receptacle 1804 has been attached to such, the inert gas control valve 1832 can be closed. After the inert gas control valve 1832 has been closed, the evacuation control valve 1838 can be opened. As such, the pressure within the passage 1808 and the receptacle 1804 can be reduced to the pressure existing in the associated reactor. After the pressure within the receptacle 1804 and passage 1808 have been reduced as such, the valve 1802 can be opened thereby allowing any nano-size particles in the passage 1050''' to pass into the receptacle 1804.

After the associated reactor is operated for a time, the receptacle 1804 can become sufficiently filled with nano particle material. At that time, the valve 1802 can be closed, and the associated reactor can be left operating.

In some embodiments, after the control valve 1802 is closed, the inert gas supply vale 1832 can be opened thereby allowing a flow of inert gas into the passage 1808. In some embodiments, the valve 1832 and/or the supply of inert gas into the supply pipe 1830 can be of sufficiently low pressure that only a slow or small flow rate of inert gas passes through the inert gas supply pipe 1834.

With the inert gas supply valve 1832 open, the receptacle 1804 can be disconnected from the lower end 1814. For example, the receptacle 1804 can be rotated to release the external threads 1812 from the internal threads 1816 until the mouth 1810 is separated from the lower end 1814. In some embodiments, the receptacle 1804 can be left on the ground G so as to allow a flow of inert gas from the passage 1808 to continue to flow downwardly toward the receptacle 1804 thereby providing a curtain of inert gas around the receptacle 1804 while an operator acts to seal off the mouth 1810.

It can be further advantageous to use an inert gas that is heavier than atmospheric air. For example, argon gas is generally significantly heavier than atmospheric air, and thus, falls readily toward the ground when released in the atmosphere. Thus, by allowing the receptacle 1804 to rest on the ground G after the mouth 1810 has been released from the lower end 1814, the argon gas can continue to flow downwardly into the upper end of the receptacle 1804, overflow, and spill over the outer surface of the receptacle 1804 and on to the ground G around the receptacle 1804. This provides, as noted above, a curtain of inert gas thereby preventing oxygen from reaching the nano particles within the receptacle 1804. As such, an operator can simply insert a stopper or cap or another type of lid on to the upper end of the mouth 1810 to seal the nano particles within the receptacle 1804 and prevent the ingress of any oxygen into the receptacle 1804.

Of course, the foregoing description is that of a preferred particle generator and method for generating particles having certain features, aspects, and advantages in accordance with the present inventions. Various changes and modifications also may be made to the above-described particle generator and method without departing from the spirit and scope of the inventions.

What is claimed:

1. A nano-scale particle generator comprising:
   a first heating device configured to vaporize raw material;
   a raw material feeder configured to feed a raw material into contact with the first heating device and to feed a gas along with the raw material through the raw material feeder, wherein the raw material feeder device comprises a conduit configured to guide the raw material and the gas toward the first heating device; and
   a heat shield disposed at an end of the conduit proximate the first heater.

2. A nano-scale particle generator comprising:
   a first heating device configured to vaporize raw material;
   a raw material feeder configured to feed a raw material into contact with the first heating device and to feed a gas along with the raw material through the raw material feeder, wherein the raw material feeder device comprises a conduit configured to guide the raw material and the gas toward the first heating device; and
   a member disposed at an end of the conduit proximate the first heater, the member configured to define a gap between a portion of an outer surface of the conduit and an inner surface of the member.

3. The generator according to claim 2, wherein the conduit comprises an aperture opening into the gap.

4. The generator according to claim 3, wherein the aperture is sized to allow the gas to flow through the aperture and into the gap and to prevent the raw material from flowing into the gap.

5. A nano-scale particle generator comprising:
   a first heating device configured to vaporize raw material; and
   a raw material feeder configured to feed a raw material into contact with the first heating device, the raw material feeder comprising a moveable receptacle defining a cavity.

6. The generator according to claim 5, wherein the cavity is configured to have an adjustable volume and is configured to be movable between an upright orientation and an inverted orientation.

7. The generator according to claim 6, wherein the cavity is in fluidic communication with a reservoir of raw material when the cavity is in the upright orientation and wherein the cavity is in fluidic communication with the heating device when it is in the inverted orientation.

8. The generator according to claim 7, wherein the raw material feeder comprises a conduit extending from the cavity toward the first heating device.

9. The generator according to claim 8, additionally comprising a gas source connected to the conduit downstream from the cavity, the gas source being configured to feed a gas into the conduit such that the gas can flow through the conduit along with the raw material in parallel.

10. A nano-scale particle generator comprising:
    a heater device configured to vaporize a raw material;
    a controller configured to maintain the heater device at a first temperature to and lower the temperature of the heater device to a second temperature that is lower than the first temperature; and
    a raw material feeder device configured to feed a raw material toward the heater device;
    wherein the controller is configured to maintain the temperature of the heater device at the first temperature which is sufficiently high so as to vaporize the raw material, to lower the temperature of the heater device to a temperature at or less than the second temperature before the raw material feeder device feeds additional raw material toward the heater device, and to raise the temperature of the heater device after the feeder device has fed the raw material toward the heater device.

11. The generator according to claim 10, wherein the controller is configured to allow at least some of the additional raw material to melt before raising the temperature of the heater device to the first temperature.

12. The generator according to claim 10, wherein the first temperature is about 1900° F. and the second temperature being about 1700° F., and wherein the raw material is granular manganese.

13. A nano-scale particle generator comprising:
    a first heating device configured to vaporize raw material; and
    means for feeding raw material and a gas together toward the first heating device, wherein the means for feeding includes an outlet end, the generator further comprising means for shielding the outlet end from heat from the first heater.

* * * * *